US012745324B2

(12) United States Patent
Cui et al.

(10) Patent No.: US 12,745,324 B2
(45) Date of Patent: Sep. 22, 2026

(54) HEATING APPARATUS, NON-COMBUSTED HEATING DEVICE, AND METHOD FOR MANUFACTURING THE SAME

(71) Applicant: SHENZHEN INNOKIN TECHNOLOGY CO., LTD., Shenzhen (CN)

(72) Inventors: Tao Cui, Shenzhen (CN); Huimin Tan, Shenzhen (CN); Tingdong Hu, Shenzhen (CN); Fang Lei, Shenzhen (CN); Hongqi Wang, Shenzhen (CN)

(73) Assignee: SHENZHEN INNOKIN TECHNOLOGY CO., LTD., Shenzhen (CN)

( * ) Notice: Subject to any disclaimer, the term of this patent is extended or adjusted under 35 U.S.C. 154(b) by 922 days.

(21) Appl. No.: 18/077,219

(22) Filed: Dec. 7, 2022

(65) Prior Publication Data

US 2023/0100970 A1 Mar. 30, 2023

Related U.S. Application Data

(63) Continuation of application No. PCT/CN2021/104674, filed on Jul. 6, 2021.

(30) Foreign Application Priority Data

Aug. 19, 2020 (CN) ........................ 202010838919.3
Aug. 19, 2020 (CN) ........................ 202021760962.4
(Continued)

(51) Int. Cl.
*H05B 3/06* (2006.01)
*A24F 40/46* (2020.01)
(Continued)

(52) U.S. Cl.
CPC ............... *H05B 3/06* (2013.01); *A24F 40/46* (2020.01); *A24F 40/70* (2020.01); *C25D 11/026* (2013.01);
(Continued)

(58) Field of Classification Search
CPC ...... H05B 3/06; H05B 2203/017; H05B 3/04; H05B 2203/013; H05B 2203/021;
(Continued)

(56) References Cited

U.S. PATENT DOCUMENTS

| | | | | |
|---|---|---|---|---|
| 5,198,640 A * | 3/1993 | Yang | H01C 1/1406 219/505 |
| 2018/0037089 A1* | 2/2018 | Baek | B60H 1/2221 |

(Continued)

FOREIGN PATENT DOCUMENTS

| | | | |
|---|---|---|---|
| CN | 107641828 A | 1/2018 |
| CN | 110670102 A | 1/2020 |

(Continued)

OTHER PUBLICATIONS

CN111134374A—translation (Year: 2025).*
International Search Report issued in corresponding international application No. PCT/CN2021/104674, dated Jul. 6, 2021, 13 pages.

*Primary Examiner* — Justin C Dodson
*Assistant Examiner* — Keith Brian Assante
(74) *Attorney, Agent, or Firm* — BAYES PLLC

(57) ABSTRACT

A heating apparatus, a non-combusted heating device and a method for manufacturing the same are disclosed. In certain aspects, the heating apparatus includes a casing with an end for receiving a product to be heated, a heating element at least partially disposed within the casing, and an insulation layer formed between an internal surface of the casing and an external surface of the heating element. The insulation layer includes a polycrystalline material having a valve metal oxide.

24 Claims, 23 Drawing Sheets

1

(30) Foreign Application Priority Data

| | | |
|---|---|---|
| Aug. 22, 2020 | (CN) | 202021773244.0 |
| Aug. 22, 2020 | (CN) | 202021786159.8 |
| Aug. 22, 2020 | (CN) | 202021787052.5 |
| Dec. 4, 2020 | (CN) | 202022900300.9 |
| Dec. 24, 2020 | (CN) | 202023169843.4 |
| Feb. 25, 2021 | (CN) | 202110210568.6 |

(51) Int. Cl.
*A24F 40/70* (2020.01)
*C25D 11/02* (2006.01)
*C25D 11/26* (2006.01)

(52) U.S. Cl.
CPC ........ *C25D 11/26* (2013.01); *H05B 2203/017* (2013.01)

(58) Field of Classification Search
CPC .............. H05B 2203/022; H05B 3/141; H05B 3/265; A24F 40/46; A24F 40/70; A24F 40/20; C25D 11/026; C25D 11/26
See application file for complete search history.

(56) References Cited

U.S. PATENT DOCUMENTS

| | | | | |
|---|---|---|---|---|
| 2019/0063462 | A1* | 2/2019 | Winkler | F04D 29/588 |
| 2019/0159514 | A1* | 5/2019 | Gammerler | A24F 1/30 |
| 2019/0297678 | A1* | 9/2019 | Schlipf | H05B 3/267 |
| 2019/0342949 | A1* | 11/2019 | Schlipf | H05B 3/03 |
| 2021/0215393 | A1* | 7/2021 | Barbano | H05B 3/03 |
| 2021/0368867 | A1* | 12/2021 | Qiu | A24F 7/00 |
| 2022/0304387 | A1* | 9/2022 | Lee | H05B 6/105 |

FOREIGN PATENT DOCUMENTS

| | | | | |
|---|---|---|---|---|
| CN | 210129971 | U | | 3/2020 |
| CN | 111134374 | A | * | 5/2020 |
| CN | 213094510 | U | | 4/2021 |
| CN | 213281488 | U | | 5/2021 |
| CN | 213428328 | U | | 6/2021 |
| WO | 2018194291 | A2 | | 10/2018 |

* cited by examiner

1

5

<u>101</u>

600

22

HEATING APPARATUS, NON-COMBUSTED HEATING DEVICE, AND METHOD FOR MANUFACTURING THE SAME

CROSS-REFERENCE TO RELATED APPLICATIONS

This application is a continuation of International Application No. PCT/CN2021/104674, filed Jul. 6, 2021, and also claims the benefit of priority to Chinese Application No. CN202010838919.3, filed Aug. 19, 2020; Chinese Application No. CN202021760962.4, filed Aug. 19, 2020; Chinese Application No. CN202021787052.5, filed Aug. 22, 2020; Chinese Application No. CN202021786159.8, filed Aug. 22, 2020; Chinese Application No. CN202021773244.0, filed Aug. 22, 2020; Chinese Application No. CN202022900300.9, filed Dec. 4, 2020; Chinese Application No. CN202023169843.4, filed Dec. 24, 2020; and Chinese Application No. CN202110210568.6, filed Feb. 25, 2021, all of which are incorporated herein by reference in their entireties.

TECHNICAL FIELD

The present disclosure relates to a heating apparatus and a non-combusted heating device, and more particularly to an electronic heating apparatus used to heat recreational or medical substances, such as tobacco.

BACKGROUND

Non-combusted heating devices have been a substitute for cigarettes for a while. A non-combusted heating device consists of a heater and tobacco, wherein the heater may be powered by an electrical power source. When the heater heats the tobacco, the tobacco creates aerosols for the user to inhale. The heating temperature of the non-combusted heating device is lower than a cigarette, thus reducing some of the noxious substances that may be generated by combusted cigarettes.

Existing non-combusted heating devices have a few drawbacks. For example, the thermal diffusivity of these heating devices is relatively low, thus causing the user to wait for a long time, generally about 15 to 20 seconds, before a heating temperature necessary for creating aerosols is reached. Moreover, a layer of a heat resistance material covering the heating devices is easy to peel off, which significantly shortens the life of the heating devices and increases the risk of burning the tobacco to release noxious substances.

In light of the above, there is a need to improve the non-combusted heating devices to reduce heat-up time and to ensure the safety of the usage at the same time.

SUMMARY

The present disclosure relates to a heating apparatus used in a non-combusted heating device to heat a product, and a method for manufacturing the same. More specifically, such a heating apparatus may include an insulation layer including a polycrystalline material having a valve metal oxide, and the insulation layer may be formed by microarc oxidation process.

In one aspect, embodiments of the disclosure provide a heating apparatus for use with a non-combusted heating device. The heating apparatus includes a casing with an end for receiving a product to be heated, a heating element at least partially disposed within the casing, and an insulation layer formed between an internal surface of the casing and an external surface of the heating element. The insulation layer includes a polycrystalline material having a valve metal oxide.

In another aspect, embodiments of the disclosure provide a heating apparatus for use with a non-combusted heating device. The heating apparatus includes a heating element with an end for receiving a product to be heated, and an insulation layer formed on an external surface of the heating element. The insulation layer includes a polycrystalline material having a valve metal oxide.

In a further aspect, embodiments of the disclosure provide a non-combusted heating device, which includes a heating apparatus, a support structure and a power source. The heating apparatus is the same as the other heating apparatuses described herein. The support structure is connected to the heating apparatus for fixating the position of the heating apparatus in the non-combusted heating device. The power source is provided in the support structure and electrically coupled to the heating apparatus for providing electrical power to the heating element.

In yet another aspect, embodiments of the disclosure provide a method for manufacturing a heating apparatus. The method includes preparing a heating element having a metal, preparing a casing including a metal, and enclosing at least a portion of the heating element with the casing. An insulation layer is formed by microarc oxidation process on at least one of an internal surface of the casing and an external surface of the heating element. The at least one surface on which the insulation layer is formed includes a valve metal.

In still another aspect, embodiments of the disclosure provide a method for manufacturing a non-combustible heating device, including providing a heating apparatus, connecting a support structure to the heating apparatus for fixating the position of the heating apparatus in the non-combusted heating device, and providing a power source in the support structure. The power source is electrically coupled to the heating apparatus for providing electrical power to the heating element.

It is to be understood that both the foregoing general description and the following detailed description are exemplary and explanatory only and are not restrictive of the invention, as claimed.

DETAILED DESCRIPTION

Figure 1:
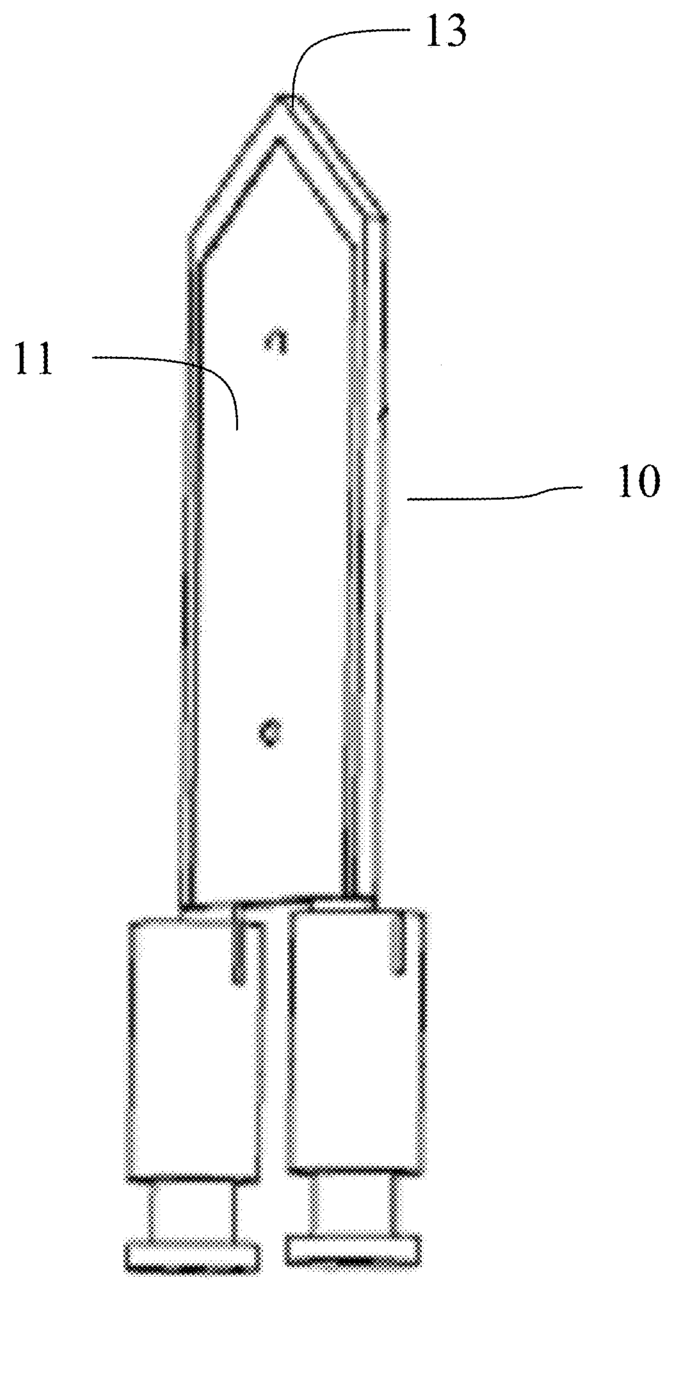
FIG. 1 illustrates a schematic diagram of an exemplary heating apparatus, consistent with some disclosed embodiments.

Reference will now be made in detail to the exemplary embodiments, examples of which are illustrated in the accompanying drawings. Wherever possible, the same reference numbers will be used throughout the drawings to refer to the same or like parts.

A non-combusted electrical heating device usually includes a housing, which encloses tobacco, a heating apparatus, a controller, and an electrical power source. The electrical power source provides electricity for the heating apparatus, and the heating apparatus heats tobacco enclosed in the housing. The heating apparatus has a heating element which may have a ceramic material. A heating wire may be embedded in the ceramic heating element. The heating wire may generate heat from electricity and pass heat to the ceramic material. The heating wire may be glazed in order to avoid heavy metal precipitation under high temperature and to protect the heating wire from scratch in use.

The present disclosure describes a heating apparatus which includes an insulation layer including a polycrystalline material having a valve metal oxide. Unlike the conventional technology where the ceramic material is formed by a thick-film printing process, the insulation layer according to the present disclosure may be formed by microarc oxidation (MAO) process. Microarc oxidation (MAO), also referred to as plasma electrolytic oxidation (PEO), is an electrochemical process to treat a surface of a metal substrate and to form an oxide coating on the metal substrate. The oxide layer may insulate the metal substrate from outside influence of electricity and also protect the metal substrate against corrosion. The composition of the oxide layer may be determined by the metal substrate, the composition of the electrolyte and the electrical parameters. In some embodiments, the oxide layer includes a polycrystalline material. These materials may have the same or superior insulation capabilities as ceramic materials.

According to some embodiments consistent with the present disclosure, the MAO process can be applied to a metal substrate having a valve metal, such as aluminum (Al), magnesium (Mg), titanium (Ti), tungsten (W), zirconium (Zr), niobium (Nb) and tantalum (Ta). The oxide layer so formed may also have a valve metal oxide. Benefits of such an oxide layer include improvement of properties of the substrate materials, such as the dielectric properties, surface strength, abrasive resistance, heat resistance, and corrosion resistance. The microhardness of the oxide layer according to the present disclosure can reach as high as 3000 HV, including, for example, in the range of 1000-2000 HV. The microhardness is thus significantly enhanced over the metal substrate over which such an oxide layer is formed. The oxide layer also provides great insulation property. In some embodiments, the insulation resistance can reach as high as 100 MΩ. Besides, the oxide layer may grow from the metal substrate under the MAO process, and thus is compact and even.

A non-combusted heating device according to the present disclosure may include a heating apparatus for receiving and heating a product, a support structure connected to the heating apparatus for fixating the heating apparatus, a chamber connected to the support structure and to receive the product, a power source providing electrical power to the heating apparatus, and a switch to control on and off of the electrical power. The heating apparatus heats a product and generates an aerosol from the product for a user to inhale. The product may be tobacco or vaping fluid that includes nicotine, spice that provides soothing or energizing flavor, medicine that helps relieve respiratory discomfort, and so on.

The heating apparatus in a non-combusted heating device according to the present disclosure can be made of a metal. The MAO process can be applied to the heating apparatus. In some embodiments, the heating apparatus includes a casing and a heating element, which both are made of a metal. The type of the metal for the casing and that for the heating element can be the same or different. The casing and the heating element are in immediate contact so that the heating element can pass heat efficiently to the casing. An insulation layer is formed between the heating element and the casing to avoid short circuit. In some embodiments, the heating apparatus includes a heating element without a casing, and the heating element is in direct contact with the product to be heated, in which case the insulation layer is formed on the external surface of the heating element. In some embodiments, the insulation layer may be formed by MAO process.

FIG. 1 illustrates a schematic diagram of an exemplary heating apparatus 1, consistent with some disclosed embodiments. According to the present disclosure, the heating apparatus 1 may be compatible with a non-combusted heating device (not shown). As shown in FIG. 1, the heating apparatus 1 may have a casing 10. The casing 10 may include a body 11 and an end 13. The end 13 may receive a product to be heated by the heating apparatus 1. In some embodiments, the product may be a nicotine-containing tobacco. In other embodiments, the product may have spice or medicine according to different needs of the user of the non-combusted heating device. The product does not necessarily have to be in a solid state. In some embodiments, the product may be in a liquid form and enclosed in a container. The casing 10 may be made of metal or any other material of high thermal conductivity. Although shown in FIG. 1 as a blade shape, the casing 10 according to the present disclosure may be constructed into other shapes, such as a triangular shape, a U-shape, a W-shape, or a cylindrical shape. It is understood that as long as desired heating efficiency and easiness of receiving the product are achieved, the shape of the casing 10 is not limited to the examples described herein.

In some embodiments, the casing 10 may be heated via a heating element (not shown), which may be fully or partially disposed within the casing 10. When the casing 10 is heated, an aerosol may be generated from the product. An aerosol contains small solid particles or liquid droplets in a gaseous form, which can be inhaled by the user of the non-combusted heating device. According to the present disclosure, the heating apparatus 1 may further include an insulation layer formed between an internal surface of the casing 10 and an external surface of the heating element. The insulation layer may have a polycrystalline material, which may have a valve metal oxide. Details of the material and formation of the insulation layer will be described hereafter.

Figure 2:
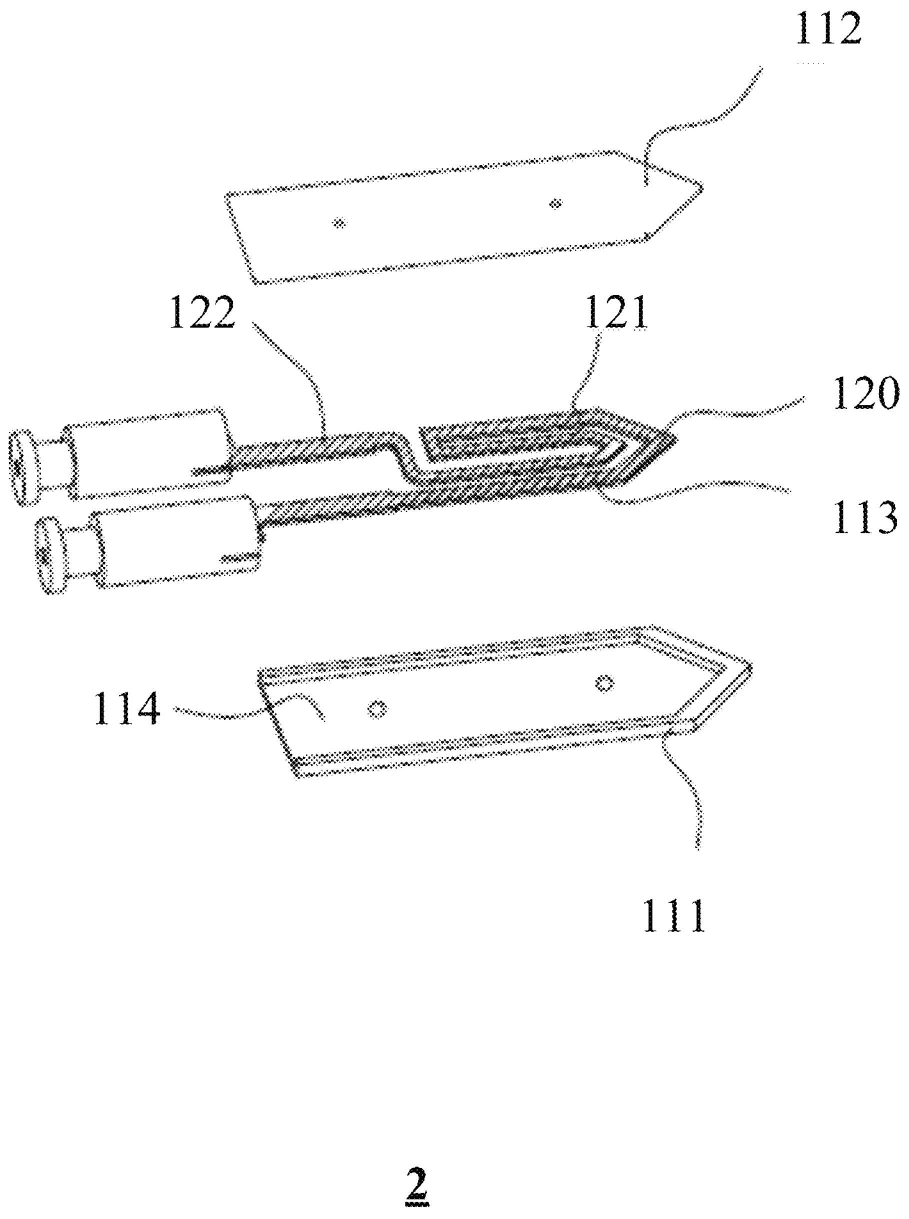
FIG. 2 illustrates an exploded view of an exemplary heating apparatus, consistent with some disclosed embodiments.

FIG. 2 illustrates an exploded view of an exemplary heating apparatus 2, consistent with some disclosed embodiments. Similar to the heating apparatus 1, the heating apparatus 2 may also include a casing and an end. As shown in FIG. 2, the casing may include a first casing plate 111 and a second casing plate 112. These two casing plates 111, 112 may be separately manufactured and subsequently assembled together to form an enclosed space. A heating element 120 may be disposed in the enclosed space. According to the present disclosure, one or both of the first casing plate 111 and the second casing plate 112 may include a holding cavity 114 formed on the internal surface thereof. According to the present disclosure, the casing cavity 114 may be formed on one or both of the internal surfaces of the two casing plates 111, 112. The holding cavity 114 may hold the heating element 120 when the heating element 120 is placed between the two casing plates 111, 112. The depth of the holding cavity 114 may be designed so that the two casing plates 111, 112 can be seamlessly assembled while leaving little to none of the room between the heating element 120 and the internal surfaces of the two casing plates 111, 112.

In some embodiments, the heating element 120 may be entirely disposed within the enclosed space of the casing. In other embodiments, the heating element 120 may be partially disposed in the casing, with the remaining portion extending outside the casing. The extended portion may be used to connect to another part of the non-combusted heating device for electrical and/or thermal conductivity.

As shown in FIG. 2, the heating element 120 may be a heating coil having a flat shape, meaning that the thickness of the heating coil is much smaller than its length and width. The length and the width directions of the heating coil may be deemed to form a flat plane parallel to the surfaces of the two casing plates 111, 112. In some embodiments, the heating element 120 may include a heating portion 121 and a conductive portion 122. The heating portion 121 may be connected to electrical power, so that when electric current passes through, the heating portion 121 may generate heat. The conductive portion 122 may also be connected to the electrical power on the one end while adjoining the heating element 121 on the other end. The electrical power may be provided by a power source of the non-combusted heating device. In some embodiments, the conductive portion 122 may include a pair of pins for electrical connection.

According to the present disclosure, an insulation layer may be formed between an internal surface of the casing and an external surface of the heating element 120. In some embodiments, an insulation layer 113 may be formed on an external surface of the heating element 120. Since the heating element 120 is disposed within the casing, the insulation layer 113 is thus positioned between the internal surface of the casing and the external surface of the heating element 120.

Figure 3:
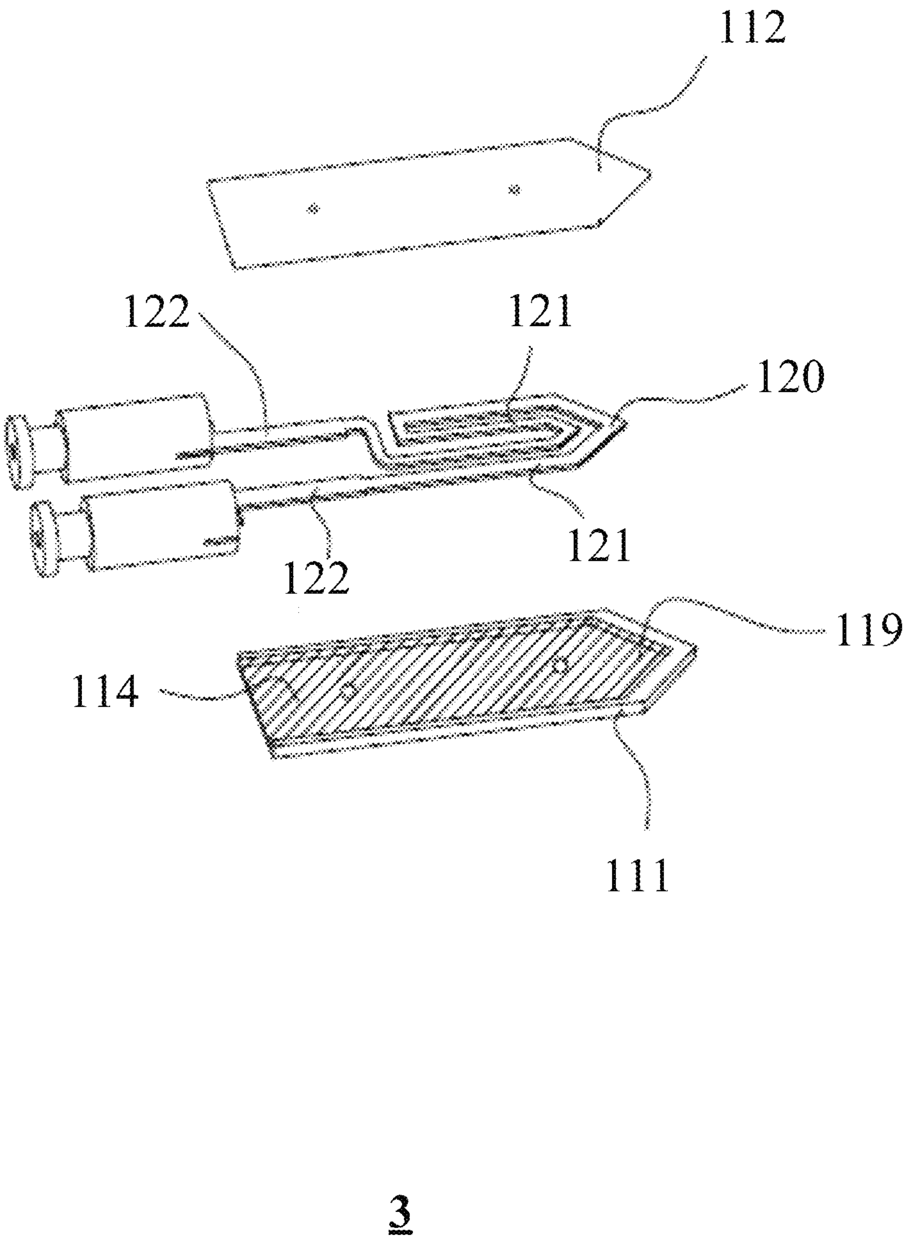
FIG. 3 illustrates an exploded view of another exemplary heating apparatus, consistent with some disclosed embodiments.

FIG. 3 illustrates an exploded view of another exemplary heating apparatus 3, consistent with some disclosed embodiments. The same parts of the heating apparatus 3 as those of the heating apparatus 2 are designated by the same reference numbers, and thus will not be repeated. Unlike the heating apparatus 2, there is no insulation layer formed on the external surface of the heating element 120. As shown in FIG. 3, an insulation layer 119 may be formed on an internal surface of the casing (e.g., the internal surface of the first casing plate 111). Since the heating element 120 is disposed within the casing, the insulation layer 119 is thus positioned between the internal surface of the casing and the external surface of the heating element 120. In some embodiments, the insulation layer 119 may be formed on only a portion of the internal surface of the casing where, if without the insulation layer 119, the heating element 120 might contact the internal surface of the casing and create a short circuit.

Consistent with some embodiments according to the present disclosure, the insulation layer formed between an internal surface of the casing and an external surface of the heating element may be formed on both the internal surface of the casing and the external surface of the heating element. It is understood that the thickness of each side of the insulation layer in these embodiments may be smaller than that of a single insulation layer 113 or 119, but the combined thicknesses of the two sides of the insulation layer may be equal to or similar to that of the single insulation layer 113 or 119.

Figure 4:
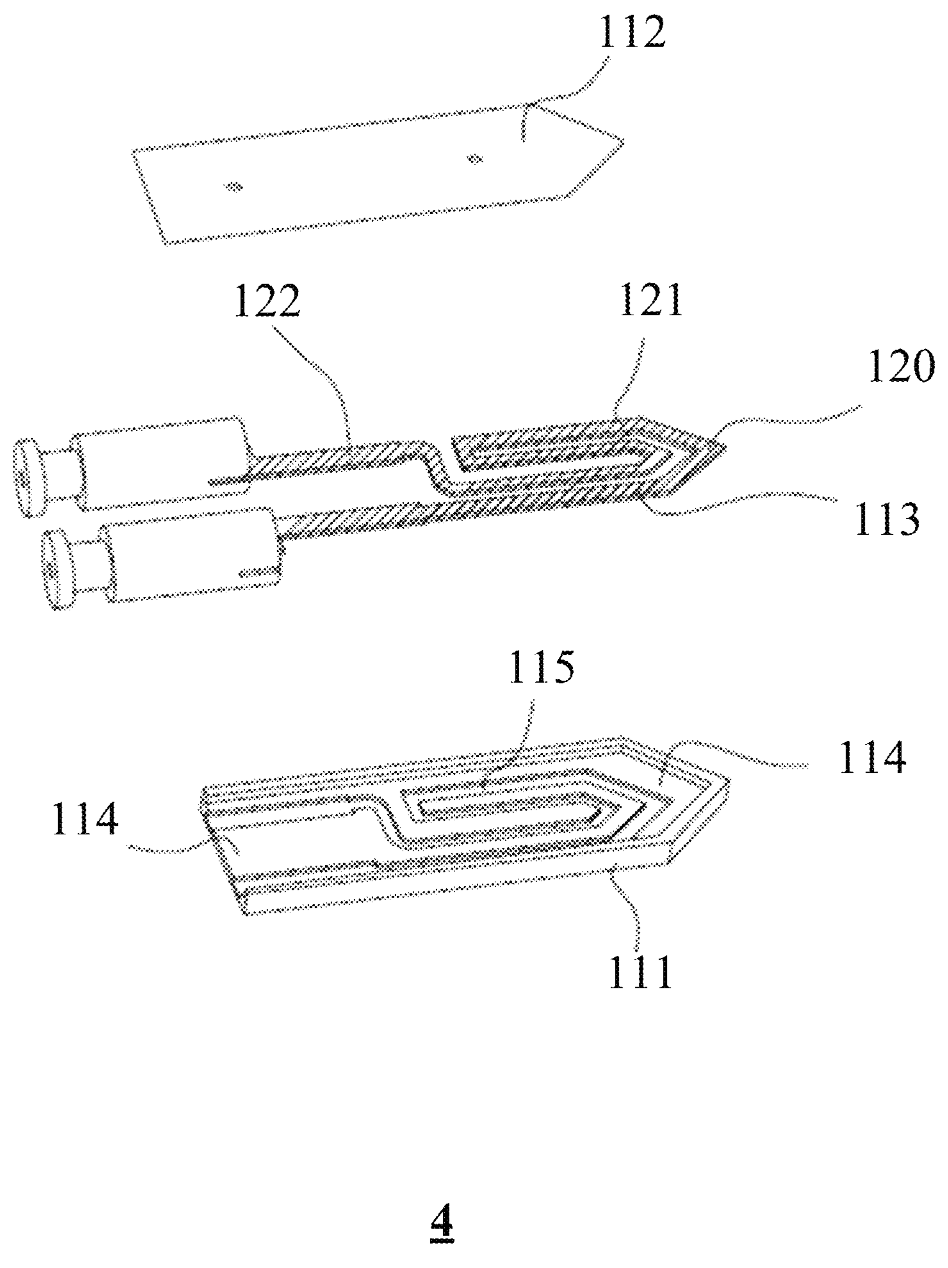
FIG. 4 illustrates an exploded view of yet another exemplary heating apparatus, consistent with some disclosed embodiments.

FIG. 4 illustrates an exploded view of yet another exemplary heating apparatus 4, consistent with some disclosed embodiments. The same parts of the heating apparatus 4 as those of the heating apparatuses 2 and 3 are designated by the same reference numbers, and thus will not be repeated. The internal surface of the casing of the heating apparatus 4 may include a positioning groove 115 formed thereon. For example, as shown in FIG. 4, the positioning groove 115 is provided in the holding cavity 114 on the internal surface of one casing plate 111. In other examples not shown herein, the positioning groove may be formed on two or more internal surfaces of each side of the body of the casing. The positioning grove 115 may be designed and manufactured to match the shape of the heating element 120. Thus, when the heating element 120 is placed within the casing, it may be fixed in the positioning groove 115.

The addition of a positioning groove 15 to fix the heating element 120 within the casing can help the heating element 120 conduct heat to the casing and then to the product more efficiently with less heat loss. It can also prevent movement of the heating element 120 within the casing. Although the positioning groove 115 in FIG. 4 has a flat coil shape matching the shape of the heating element 120, it is noted that this is just one example and a person of ordinary skill in the art would know, with the teaching of the present disclosure, that the same disclosure can be implemented by a positioning groove and a heating element of other shapes while achieving the same purpose of the present disclosure. The heating element 120 can be fixed in the positioning groove 115 by bolting, via pressure passed from the casing 10, or through other suitable connection mechanism.

Figure 5:
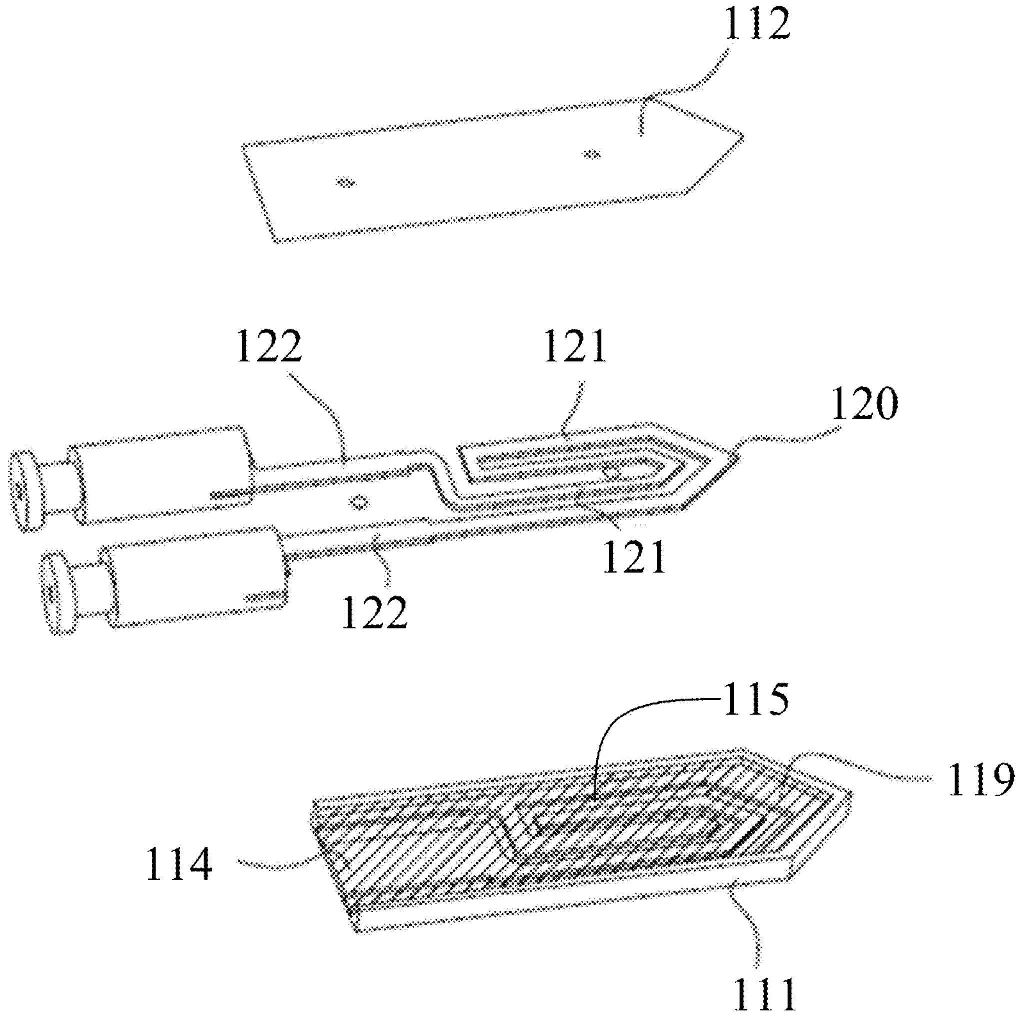
FIG. 5 illustrates an exploded view of still another exemplary heating apparatus, consistent with some disclosed embodiments.

FIG. 5 illustrates an exploded view of still another exemplary heating apparatus 5, consistent with some disclosed embodiments. The same parts of the heating apparatus 5 as those of the heating apparatuses 2-4 are designated by the same reference numbers, and thus will not be repeated. Unlike the heating apparatus 4, there is no insulation layer formed on the external surface of the heating element 120. As shown in FIG. 5, an insulation layer 119 may be formed on an internal surface of the casing (e.g., the internal surface of the first casing plate 111). Similar to the heating apparatus 4, the internal surface of the casing of the heating apparatus 5 may include a positioning groove 115 formed thereon. The function and advantage of such a positioning groove 115 are the same as that of the heating apparatus 4 and thus will not be repeated.

In each of the above exemplary heating apparatuses 2-5, the casing thereof may enclose and hold the heating element 120 tightly, and the heating element 120 may be in immediate contact with the internal surfaces of the casing. This configuration allows the heat generated by the heating element 120 to pass efficiently to the casing and then to the product. As a result, the wait time for the generation of aerosol can be significantly shortened from the previous 15-20 seconds to only a few seconds (e.g., less than 5 seconds). Therefore, the user can immediately start inhaling the aerosol after powering on the non-combusted heating device incorporating the heating apparatus according to the present disclosure.

The casing of the heating apparatuses 2-5 described above all consist of two separate casing plates 111, 112. These are non-limiting examples under the present disclosure. In some embodiments, the casing of the heating apparatus may include a unibody. It is noted that a "unibody" structure does not require the casing to be constructed as one piece from the beginning to the end. As long as the structure can be integrated into a single piece in the middle of manufacturing by, for example, welding so that no separate parts are conspicuously discernable, the structure can be deemed a unibody according to the present disclosure. In other embodiments, the number of casing plates may be more than two. In yet other embodiments, the heating apparatus according to the present disclosure may include a heating element without a casing. As a result, the heating element alone, coated with an insulation layer on its external surface, can achieve the same purpose of heating the product received at an end of the heating element.

According to the present disclosure, the insulation layer formed between the internal surface of the casing and the external surface of the heating element, such as the insulation layers 113, 119 described above, may include a polycrystalline material. Such materials may further include a valve metal oxide. Valve metal oxides have superior dielectric properties, as well as outstanding surface strength, abrasive resistance, heat resistance, and corrosion resistance. Thus, such materials are ideal to make up the insulation layer according to the present disclosure. Additionally, the valve metal oxide may be formed on one or more of the external surfaces of the heating element or at least a portion of the internal surface of the casing through an MAO process. In these cases, the heating element, the casing, or both may include the same valve metal as that of the valve metal oxide of the polycrystalline material. In some embodiments, the valve metal may be titanium or aluminum, and thus the resulted valve metal oxide may have the same properties as ceramics, which are known to be good insulation materials.

In some embodiments, the insulation layer may be formed as a continuous layer. The thickness of the insulation layer according to the present disclosure may be between 5 μm and 20 μm, which is much smaller than that of the heating element and thus almost neglectable in considering the size of the heating element fitted into a holding cavity of the casing.

In some embodiments, one or both of the heating element and the casing of the heating apparatus may be made of a valve metal, such as titanium. The valve metal has a good temperature coefficient of resistance, so that the working temperature of the heating apparatus can be controlled. For example, the working temperature of titanium can be controlled within ±2° C., which is one of the best among all valve metals. The use of the valve metal may dispense with the need for other temperature-control mechanisms, thus simplifying the manufacture process and component complexity of the heating apparatus according to the present disclosure.

According to the present disclosure, the insulation layer may be formed continuously. Using a valve metal oxide as an insulation layer over the heating element or the casing of the heating apparatus also has the advantage of self-healing. Where an insulation layer is formed on the surface of a valve metal by MAO process, the insulation layer can repair by itself any cracks or holes in the layer because the electricity supplied from the power source of the non-combusted heating device causes a continuing MAO process over the exposed valve metal of the heating element or the casing. Therefore, if the insulation layer is worn or damaged, it will repair itself and thus no electrical leakage will happen.

Figure 6:
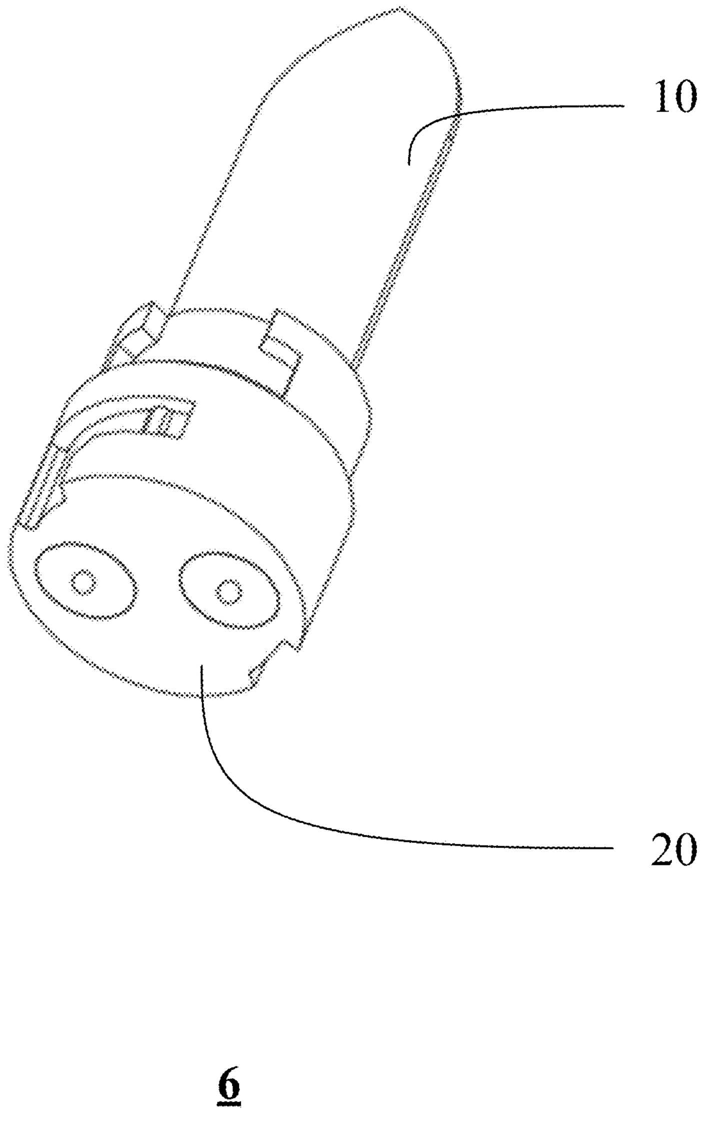
FIG. 6 illustrates an exemplary heating apparatus, consistent with some disclosed embodiments.

FIG. 6 illustrates an exemplary heating apparatus 6, consistent with some disclosed embodiments. The heating apparatus 6 may be compatible with a non-combusted heating device. In addition to the casing 10, the heating apparatus 6 may further include a limiter bracket (not shown) and a base 20. Similar to the heating apparatuses 2-5, the casing 10 of the heating apparatus 6 may enclose a heating element (not shown). The base 20 may electrically connect the heating element with a power source of the non-combusted heating device. Thus, when the power source provides electrical power to the heating element, a product received at the end of the casing 10 can be heated to generate aerosol for the user to inhale.

Figure 7:
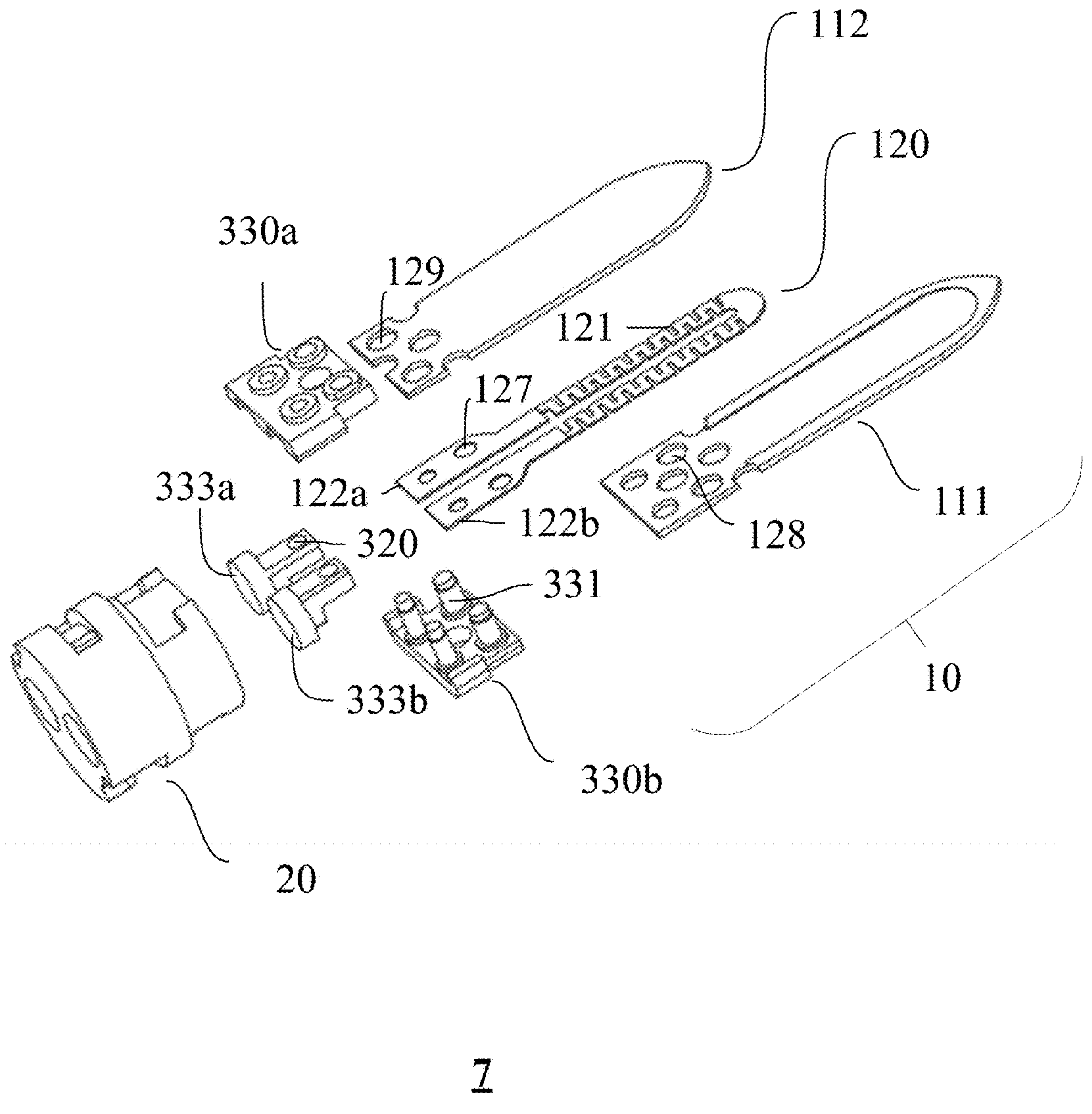
FIG. 7 illustrates an exploded view of an exemplary heating apparatus, consistent with some disclosed embodiments.

FIG. 7 illustrates an exploded view of an exemplary heating apparatus 7, consistent with some disclosed embodiments. The heating apparatus 7 may include a casing 10, a heating element 120, a limiter bracket (including a pair of covers 330*a*, 330*b* and a plurality of limiter rods 331), a pair of contacts 333*a*, 333*b*, and a base 20. In some embodiments, the casing 10 is formed by integrating a first casing plate 111 and a second casing plate 112. The heating element 120 may include a heating portion 121 and a conductive portion that includes a pair of pins 122*a*, 122*b* electrically coupled to the power source. When the heating apparatus 7 is assembled, the heating element 120 may be enclosed in the casing 10, and the pair of pins 122*a*, 122*b* may be fixated to the limiter bracket.

Consistent with the present disclosure, the heating element 120 may have at least one hole 127 in the conductive portion. As shown in FIG. 7, the hole 127 may be opened on one or both of the pins 122*a*, 122*b*. Correspondingly, the casing 10 may also have at least one hole. For example, the first casing plate 111 and the second casing plate 112 may respectively have at least one hole 128, 129. When the heating apparatus 7 is assembled, the hole of the casing 10 may be positioned to correspond to the hole of the heating element 120. Therefore, one or more of the limiter rods 331 of the limiter bracket may pass through the holes, thereby fixating the casing 10 and the heating element 120 to the limiter bracket.

In some embodiments, the pair of contacts 333*a*, 333*b* may also have at least one hole 320 corresponding to the position of the at least one hole of the heating element 120. The limiter rod 331 may also pass through the hole 320 of the pair of contacts 333*a*, 333*b* so that they can be fixated to the limiter bracket as well. According to the present disclosure, the limiter bracket may fixate the relative positions of the casing 10, the heating element 120, and the pair of contacts 333*a*, 333*b*. The pair of covers 330*a*, 330*b* may be conjoined to enclose the pair of pins 122*a*, 122*b*.

According to the present disclosure, the base 20 may have an installment cavity (not shown) where the pair of covers 330*a*, 330*b* and the pair of contacts 333*a*, 333*b* may be inserted. This allows the pair of pins 122*a*, 122*b* of the heating element 120 to be electrically connected to the power source via a contact in the installment cavity. The pair of pins may be removed if malfunction is detected or the heating apparatus 7 needs to be replaced with a different one. In some embodiments, after the insertion, the installment cavity may be injected with plastic of high heat resistance in order to insulate the heat generated by the heating apparatus 7 from passing to the other components of the non-combusted heating device. In some embodiments, the base 20 may be made of high heat resistance plastic in order to prevent the heat generated by the heating apparatus 7 from passing on to the other components of the non-combusted heating device.

Although the above description uses the limiter rods 131 as examples to fixate and connect the casing 10, the heating element 120, the limiter bracket, and the pair of contacts 333*a*, 333*b*, it is noted other suitable mechanism of connection may be employed to achieve the same purpose and result under the teaching of the current disclosure.

Figure 8A:
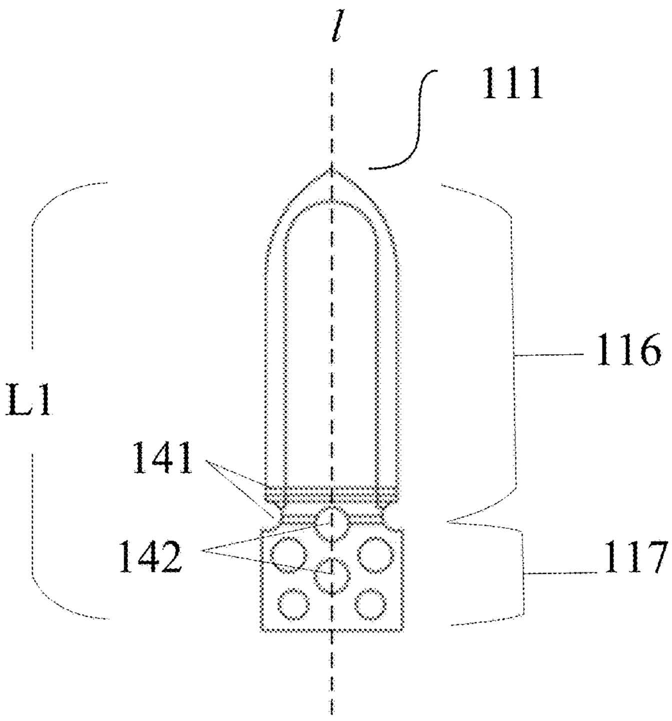
FIGS. 8A and 8B illustrate another view of the first and second casing plates shown in FIG. 7, consistent with some disclosed embodiments.
Figure 8B:
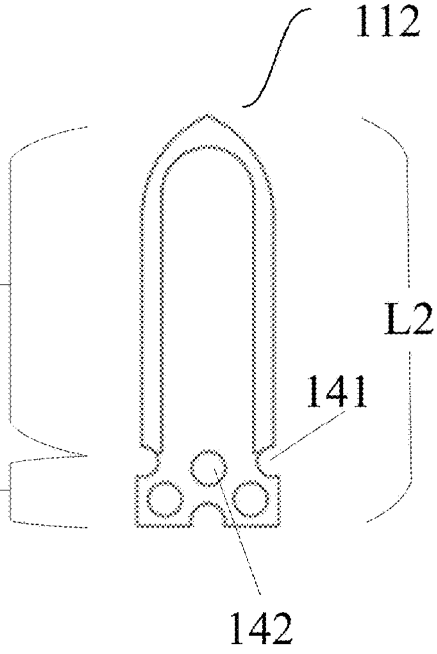

FIGS. 8A and 8B illustrate another view of the first and second casing plates 111, 112 shown in FIG. 7, consistent with some disclosed embodiments. As discussed above, the casing plates 111, 112 may be conjoined to form the casing 10 of the heating apparatus 7, and the heating element 120 may be partially disposed within the casing 10. In some embodiments, the first casing plate 111 has a length of L1 and the second casing plate 112 has a length of L2. As shown in FIGS. 8A and 8B, L1 is longer than L2. The difference between L1 and L2 may allow at least a portion of the heating element 120 to be exposed outside the casing 10 on the shorter side of the two casing plates. The exposed portion of the heating element 120 may be electrically connected with a power source of a non-combusted heating device incorporating the heating apparatus 7. Moreover, the longer side of the two casing plates 111, 112 may also provide support for the heating element 120 enclosed in the casing 10, so that the casing 10 and the heating element 120 may be fixated to a base of the heating apparatus 7 with enhanced stability. It is noted that this is just one example and a person of ordinary skill in the art would know, with the teaching of the present disclosure, that the same disclosure can be implemented by setting the two casing plates 111, 112 to have other suitable lengths, whether they are different or the same, while achieving the same purpose of the present disclosure. In some embodiments where the lengths L1 and L2 are the same, at least a portion of the heating element may be exposed outside the casing by extending from the bottom edge of the casing. Thus, the heating element may be removably connected to the power source via a contact as well.

As illustrated in FIGS. 8A and 8B, the first casing plate 111 and the second casing plate 112 each include a heating portion 116 and a fixation portion 117. Accordingly, when the casing plates 111, 112 are conjoined to form the casing 10, the casing 10 may also include a heating portion and a fixation portion. In some embodiments, the position of the heating portion of the casing 10 may be at a position corresponding to the heating portion 121 of the heating element 120, and the fixation portion of the casing 10 may be at a position corresponding to the conductive portion 122 of the heating element 120.

When the heating apparatus according to the present disclosure is in operation, the heating portion 121 may generate heat and passes the heat to the heating portion of the casing 10. To reduce unwanted heat loss from the conductive portion 122 and the fixation portion of the casing 10, at least one of the heating element 120 or the casing 10 may have a heat insulation structure. Although the following description uses holes or grooves as heat insulation structures, it is noted that this is just one example and a person of ordinary skill in the art would know, with the teaching of the present disclosure, that the same disclosure can be implemented by designing the insulation structure at other positions or by using other insulation structures while achieving the same purpose of the present disclosure.

In some embodiments, the heat insulation structure may be formed between the heating portion 116 and the fixation portion 117 of the casing 10 and/or between the heating portion 121 and the conductive portion 122 of the heating element 120, so that the heat generated by the heating element 120 can be preserved at the heating portion 116 and the heating portion 121. Therefore, the heat generated by the heating element 120 is unable to pass on to the fixation portion 117 and/or the conductive portion 122, and consequently heat losses are reduced with the presence of the heat insulation structure.

As shown in FIGS. 8A and 8B, one example of the heating insulation structure according to the present disclosure includes at least one heat insulation groove 141 and/or at least one heat insulation hole 142 at one side of the casing (e.g., the casing plate 111). The heat insulation groove 141 may be provided at or near the division line between the heating portion 116 and the fixation portion 117 of the casing plate 111. In some embodiments, the heat insulation groove 141 may be perpendicular to the line/extending from the heating portion of the casing 10 to the fixation portion of the casing 10, as shown in FIG. 8A. In some embodiments, the heating insulation groove 141 may be a straight line or a wavy line.

In some embodiments, when the heating element 120 is in contact with the first casing plate 111 or the second casing plate 112 on one side of the casing 10, the heat insulation groove 141 may be on the other side of the casing 10. In other embodiments, when the heating element 120 is inside the casing 10, the insulation groove 141 may be provided on the external surface of the casing 10. In still other embodiments, the heat insulation groove 141 may be provided on both sides of the casing plates. In yet other embodiments, the heat insulation groove 141 may have a semicircular carve-out on the side edge of the casing plates 111 and 112, as shown in FIGS. 8A and 8B. This reduces the cross-section area of the casing 10, therefore shrinking the heat transmission path, so that heat losses are lowered. On one hand, the reduction of heat transmission to the fixing portion can prevent overheating of the electrodes; on the other hand, the reduction of heat loss can improve heating efficiency of the heating portion and make sure the heating portion to heat up quickly.

Consistent with other embodiments according to the present disclosure, the casing 10 may also include at least one heat insulation hole 142. The heat insulation hole 142 may be provided on the first casing plate 111, the second casing plate 112, or both. The heat insulation hole 142 may be positioned in or near the center of the fixation portion 117 of the casing plates 111, 112. In some embodiments, the line / may pass through the heat insulation hole 142, as shown in FIG. 8A. It is understood that the insulation hole 142 does not necessarily have to be on the conductive portion. In other embodiments not shown herein, the insulation hole may be provided on the heating portion of the heating element. The insulation hole in such embodiments must be punched at a location closer to the conductive portion than to the other end of the heating element, which receives the product to be heated, because the heat transmission towards the other end of the heating element should not be compromised by such an insulation hole. According to the present disclosure, the heat insulation hole may work in a similar mechanism as the heat insulation groove 141 in terms of reducing the area of the heat transmission path, and thus will not be repeated.

Figure 9:
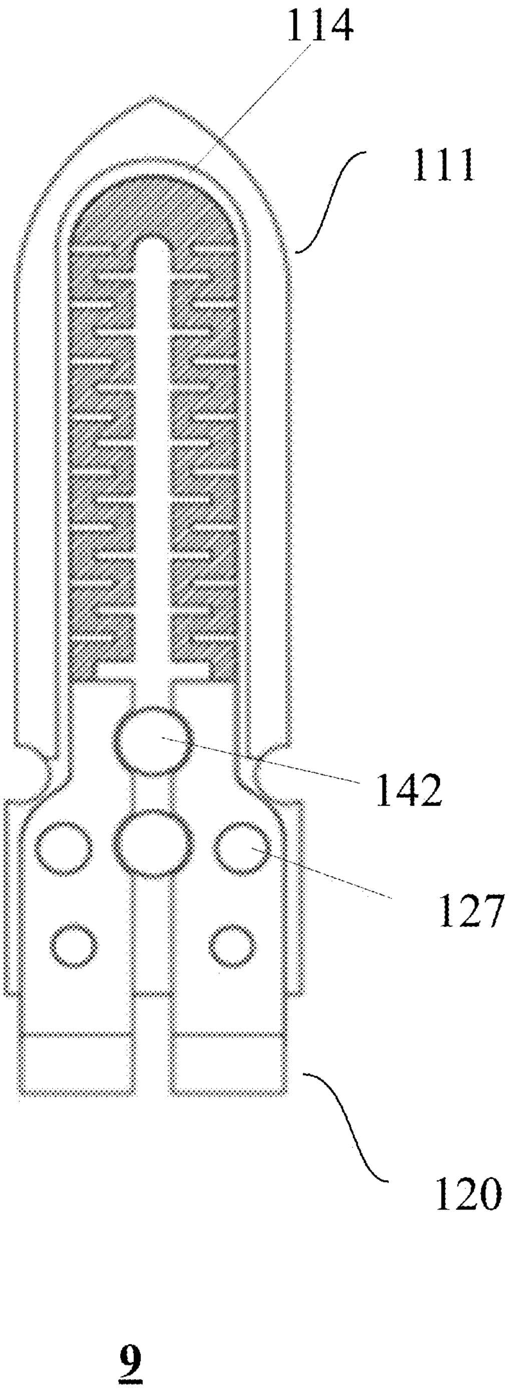
FIG. 9 illustrates a top view of a partially assembled heating apparatus, consistent with some disclosed embodiments.

FIG. 9 illustrates a top view of a partially assembled heating apparatus 9, consistent with some disclosed embodiments. As shown in FIG. 9, the heating element 120 fits into a holding cavity 114 of a first casing plate 111 of the heating apparatus 9. As described above, the heating apparatus 9 may have a second casing plate (not shown) that may or may not have a holding cavity, depending on the relative thickness between the holding cavity 114 and the heating element. Once assembled, the first casing plate 111 and the second casing plate form the casing of the heating apparatus 9, thus enclosing the heating element 120. Consequently, FIG. 9 also demonstrates the relative position of the heating element 120 inside the casing once the heating apparatus 9 is assembled.

Similar to the exemplary heating apparatuses described above, the heating element 120 of the heating apparatus 120 may include at least one hole 127, and the first casing plate 111 may include at least one hole (not shown) as well. It is understood that the second casing plate may also include at least one hole. These holes may correspond to each other and, once assembled, overlap with each other, as shown in FIG. 9. In some embodiments, the overlapping holes can receive a limiter rod of limiter bracket in order to fixate and connect the casing and the heating element 120 with other components of the non-combusted heating device incorporating the heating apparatus 9. In other embodiments, the overlapping holes may be utilized as a mounting hole via a mounting mechanism, such as a screw or a snap, to achieve the same purpose of fixation and connection. Needless to say, the heating element 120 and the first casing plate 111 of the heating apparatus 9 may further include one or more heat insulation holes 142 in order to reduce the heat transmitted from the heating portion of the heating element 120 to a base (not shown) of the heating apparatus 9.

Figure 10:
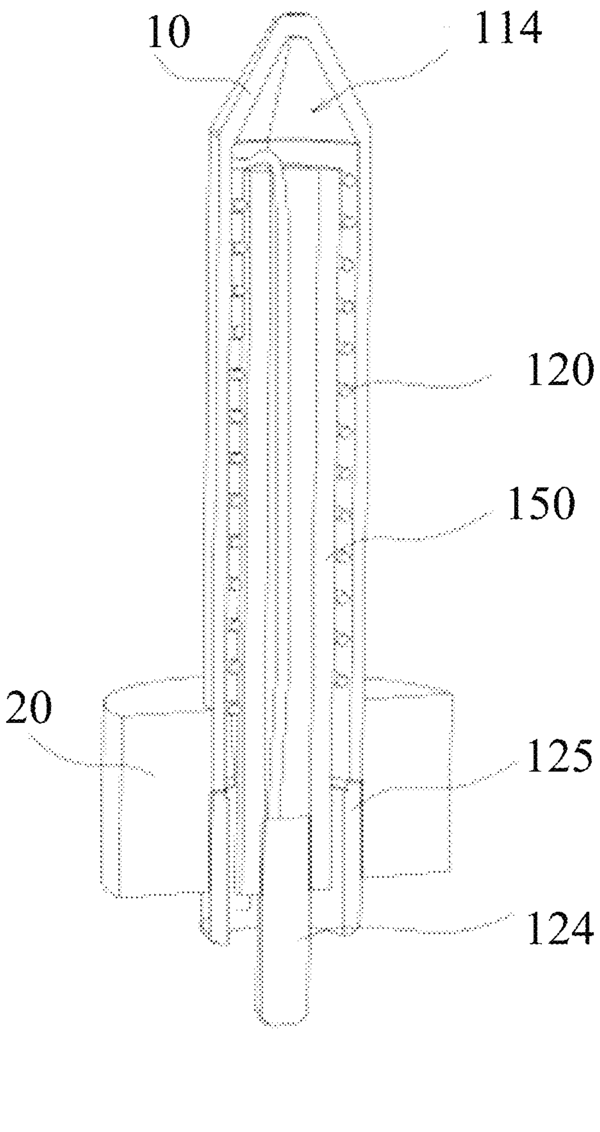
FIG. 10 illustrate a cross-section view of another exemplary heating apparatus, consistent with some disclosed embodiments.

FIG. 10 illustrates a cross-section view of another exemplary heating apparatus 100, consistent with some disclosed embodiments. The heating apparatus 100 may have a casing 10 and a base 20. As shown in FIG. 10, the casing 10 may be a unibody casing with a cylindrical shape, and a heating element 120 may fit into a holding cavity 114 of the casing 10. In some embodiments, the heating element 120 may be of a solenoid shape. As shown in FIG. 10, the heating element 120 spirals around a supporting rod 150. One end of the heating element 120 is outside of the supporting rod 150 and electrically connected to a first electrode 125. The other end of the heating element 120 is within the supporting rod 50 and electrically connected to a second electrode 124. The supporting rod 150 may be made of a dielectric material, such as glass or ceramic, so that the two ends of the heating element 120 and the two electrodes 124 and 125 respectively connected thereto are insulated from each other, thus avoiding a short circuit. In some embodiments, the heating element 120 may be covered by an insulation layer (not shown) generated by an MAO process on the external surface of the heating element 120. In this way, the neighboring loops of the solenoid-shaped heating element 120 are insulated from each other, thus avoiding a short circuit.

Figure 11:
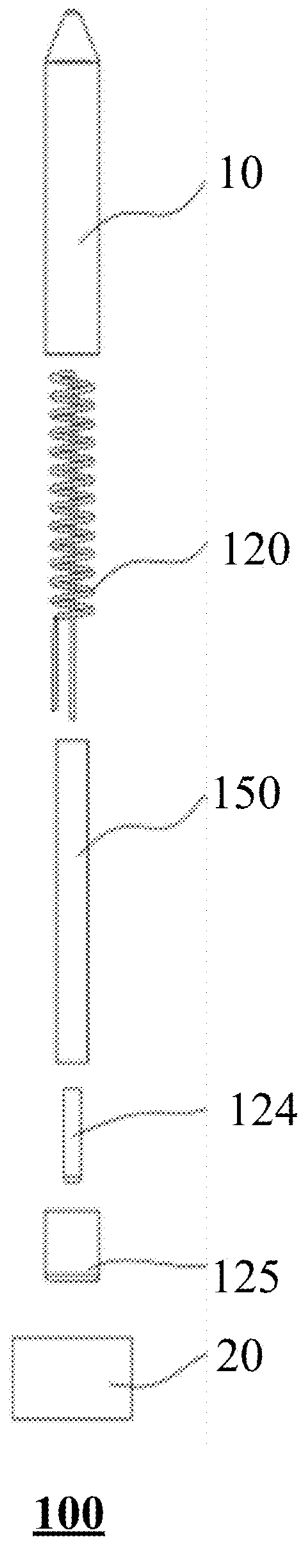
FIG. 11 illustrates an assembly view of the exemplary heating apparatus shown in FIG. 10, consistent with some disclosed embodiments.
Figure 12:
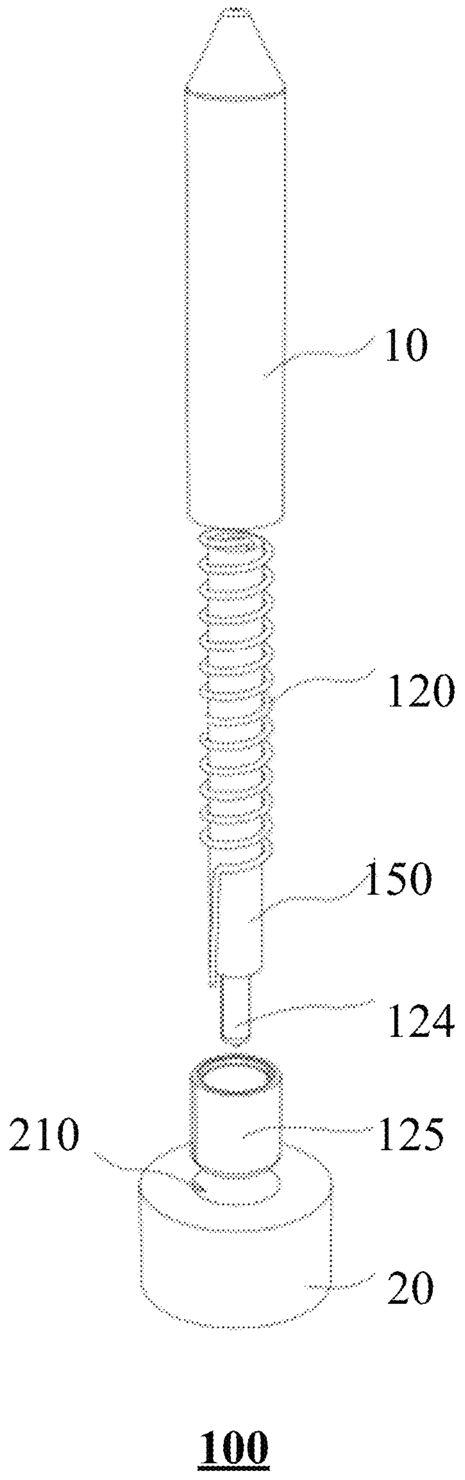
FIG. 12 illustrates another assembly view of the exemplary heating apparatus shown in FIG. 10, consistent with some disclosed embodiments.

FIGS. 11-12 illustrate assembly views of the exemplary heating apparatus 100 shown in FIG. 10, consistent with some disclosed embodiments. The base 20 may have an installment cavity 210. The electrodes 124 and 125, the lower end of the supporting rod 150, and the lower end of the heating element 120 may be inserted into the installment cavity 210. As shown in FIG. 12, the electrode 124, the supporting rod 150, the heating element 120, and the electrode 125 are positioned from a longitudinal axis of the heating apparatus 10 towards the periphery of the heating apparatus 100. After the insertion, the base 20 may fixate the relative positions of them. In some embodiments, the electrode 124 may connect to a cathode of the power source of the non-combusted heating device, and the electrode 125 may connect to an anode of the power source. Thus, the heating element 120 may be heated by electricity provided from the power source. It is also noted that a casing is not necessary to achieve the purpose of the present disclosure, a heating apparatus can include a heating element without a casing and the heating element can be the same as or similar to those discussed hereinabove.

Figure 13:
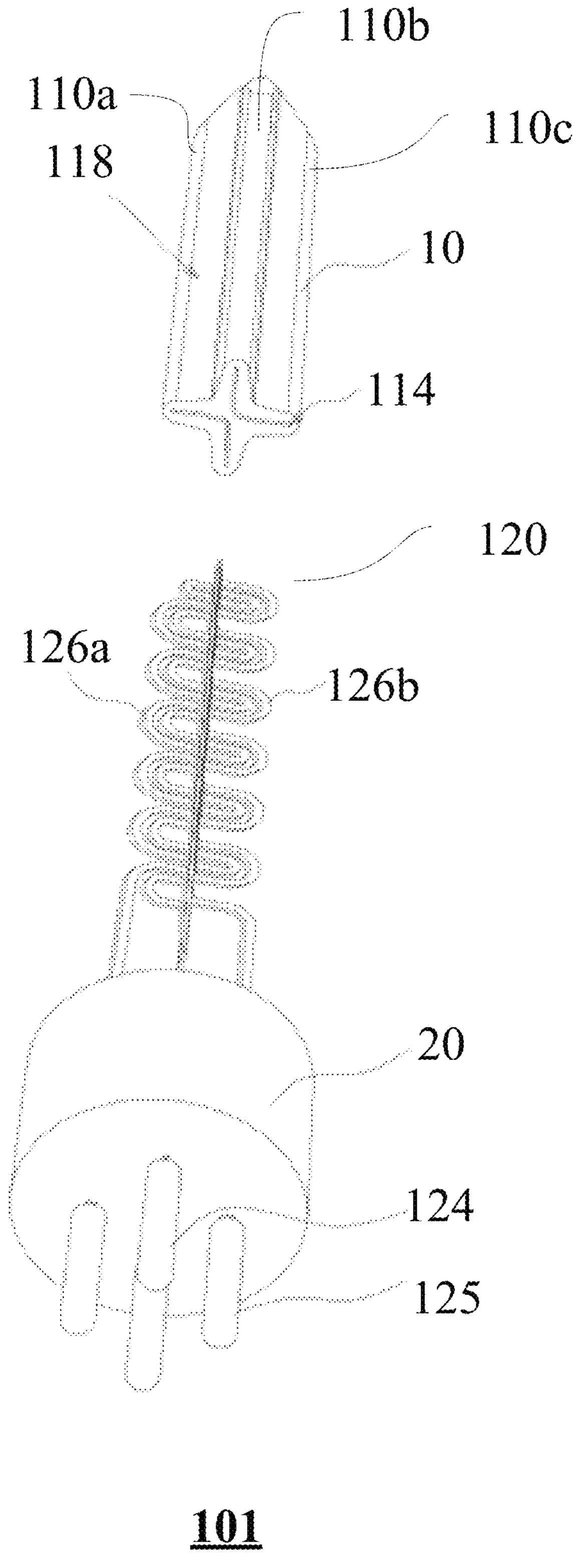
FIG. 13 illustrates an assembly view of another exemplary heating apparatus, consistent with some disclosed embodiments.
Figure 14:
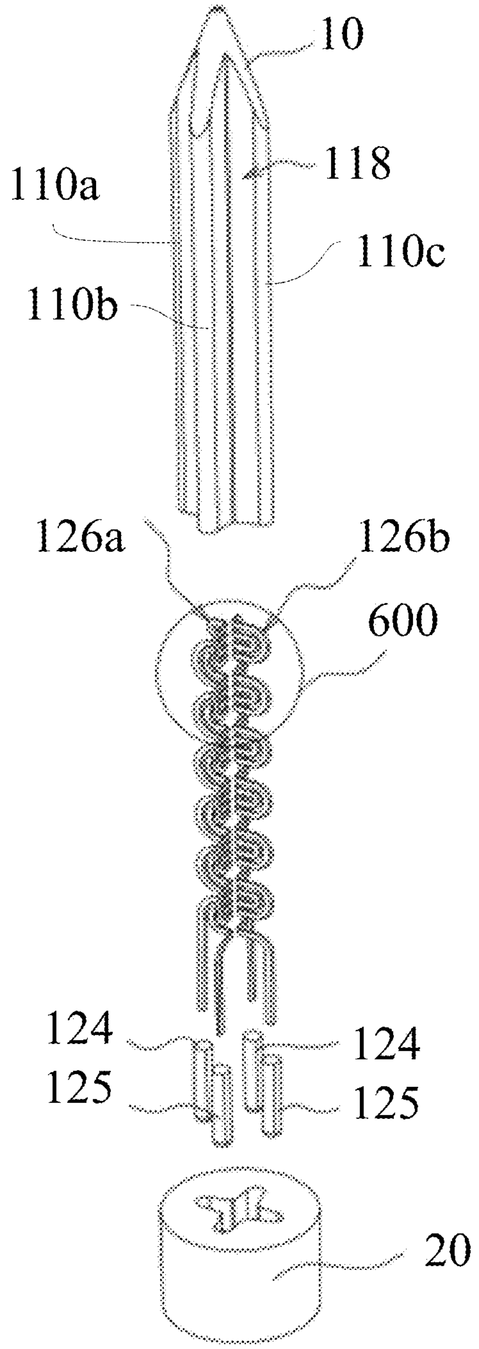
FIG. 14 illustrates an assembly view of the exemplary heating apparatus shown in FIG. 13, consistent with some disclosed embodiments.

FIGS. 13-14 illustrate assembly views of another exemplary heating apparatus 101, consistent with some disclosed embodiments. As shown in FIG. 13, the heating apparatus 101 has a cross-section of a cross shape, and each of the ridges 110*a*, 110*b*, 110*c* of the casing is perpendicular to its neighboring ridge. The heating element 120 may include at least two heating coils 126*a*, 126*b* which are symmetrical along a longitudinal axis of the heating element 120. Each of the heating coils 126*a*, 126*b* may have a 90-degree V-shaped cross section. Each of the heating coils 126*a*, 126*b* may be formed by folding or bending a conductive metal strip, which converts electrical power to heat. Each of the heating coils 126*a*, 126*b* may be separated from its adjacent heating coil by a space. In some embodiments, the heating coils 126*a*, 126*b* may have an insulation layer covered thereon, which may be generated by MAO process on the external surface of the heating coils so that the folding or bending portions of the metal strip do not directly contact with each other, thus avoiding a short circuit.

In some embodiments, the casing 10 may include at least two casing grooves 118 on the external surface of the casing 10, which forms a plurality of ridges (e.g., ridges 110*a*, 110*b*, 110*c*) of the casing 10. As shown in FIGS. 13-14, the ridges are in positions corresponding to the shape of the heating coils 126*a*, 126*b*. The ridges of the casing 10 increase the area of the external surface of the casing 10, therefore increasing the contact area between the product and the casing 10. This configuration may speed up the heating process so that the aerosol can be produced faster for the user to inhale. It also enhances heating efficiency and reduces heat losses.

In some embodiments, the casing 10 may also include a plurality of holding cavities 114. Each holding cavity 114 can hold one heating coil (e.g., heating coil 126*a* or 126*b*). As shown in FIG. 13, the cross section of the space of the casing 10 includes two holding cavities 114 of V shapes that are symmetrical along a longitudinal axis of the casing. Thus, the shape of the holding cavities 114 matches the shape of the heating coils. As a result, the heating coil may be tightly fit into the casing 10 and in immediate contact with the holding cavity 114, so that the casing 10 may pass the heat generated by the heating element 120 fast and efficiently to the product. It also prevents displacement of the heating element 120 within the casing.

As illustrated in FIGS. 13-14, each of the heating coils 126*a*, 126*b* is electrically connected to a pair of electrodes 124 and 125. The connection may be formed by laser welding process, which provides good structural strength and low connection resistance. The electrodes 124 and 125 may be fixated to the base 20 and may extend outside of the base 20. The electrodes 124 and 125 may be further coupled to the power source of the non-combusted heating device so that the electric current passing through the heating element 120 may be converted to heat.

Figure 15:
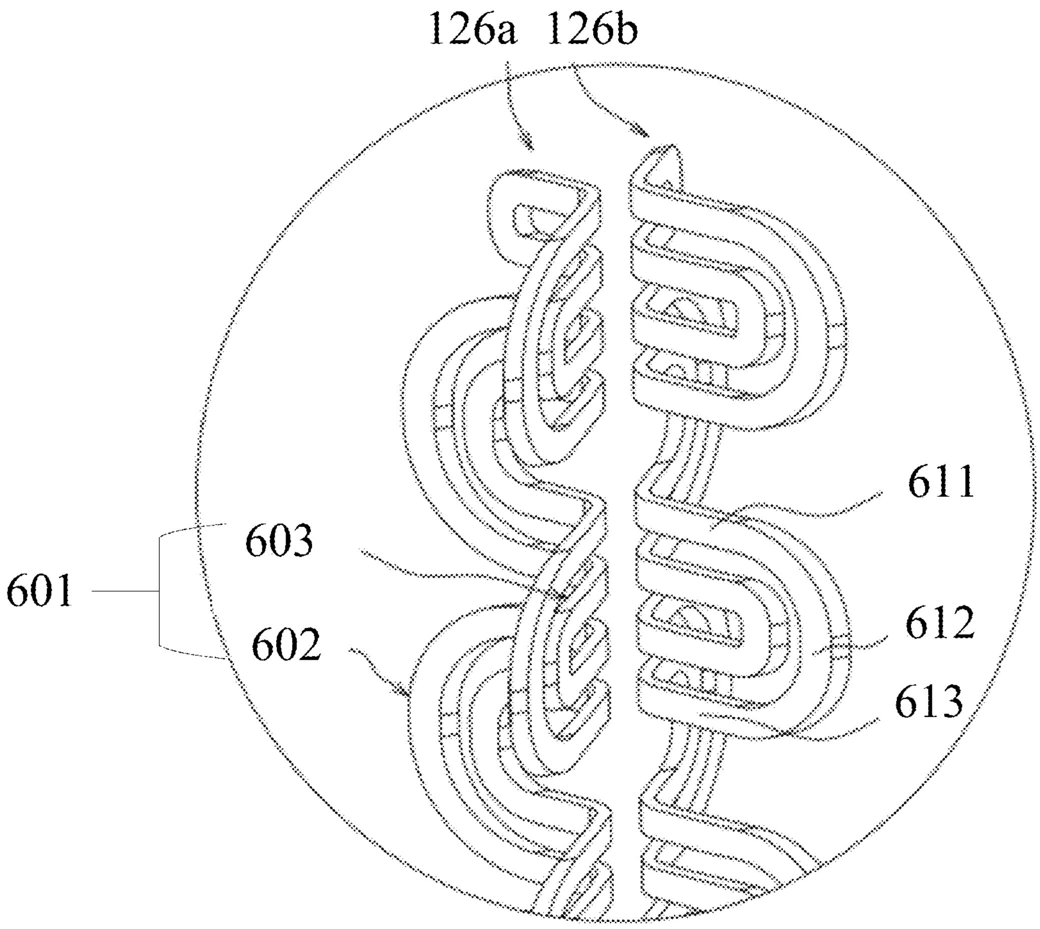
FIG. 15 illustrates an enlarged view of a part of the exemplary heating apparatus shown in FIG. 14, consistent with some disclosed embodiments.

FIG. 15 illustrates an enlarged view of a part 600 of the exemplary heating apparatus 101 shown in FIG. 14, consistent with some disclosed embodiments. Each of the heating coils 126*a*, 126*b* may include a plurality of heating fins 601, which may be arranged along a longitudinal axis of the heating element 120. Each of the heating fins 601 may include a first heating strip 602 and a second heating strip 603. The first heating strip 602 and the second heating strip 603 are both in a U shape. For each heating fin 601, each heating strip (i.e., the first heating strip 602 or the second heating strip 603) may include a first straight portion 611, a curved portion 612, and a second straight portion 613. The first straight portion 611 and the second straight portion 613 may be parallel to each other, and both perpendicular to the longitudinal axis of the heating element 120. As shown in FIG. 15, the first straight portion 611 connects with one end of the curved portion 612 and the second straight portion 613 connects with the other end of the curved portion 612. The connection among them is processed as a smooth connection so that no stress is accumulated at the connecting part and the structural strength of the heating coils 126*a*, 126*b* is enhanced. It is noted that this is just one example and a person of ordinary skill in the art would know, with teaching of the present disclosure, that the function of the first heating strip 602 and the second heating strip 603 could be realized by shapes other than a U shape, such as an arc shape, an angle shape, a wave shape, etc., and the shapes of the first heating strip 602 and the second heating strip 603 could be the same or different.

It is also noted that a casing is not necessary to achieve the purpose of the present disclosure. A heating apparatus may include a heating element without a casing and the heating element can be similar as those discussed above in FIGS. 13-15.

According to the present disclosure, the heating apparatuses described herein may also be incorporated into a non-combusted heating device, which is also known as a heated tobacco product (HTP), heat-not-burn product, electrically heated tobacco system, smokeless cigarette, etc. Such a device heats the tobacco or other substances at a lower temperature than cigarettes that are conventionally lit up for use. The working temperature of these devices is generally below 600° C. The highest operation temperature of the heating element according to the present disclosure is about 800° C., thus well beyond the upper level of the working temperature of these devices. Thus, it can withstand an abrupt surge in the working temperature and still keep its functional characteristics intact. Moreover, the heating element using a valve metal with superior temperature coefficient of resistance according to the present disclosure normally operates at a temperature between 200° C. and 380° C., making it safer for the user than the conventional non-combusted heating devices of a much higher working temperature.

Figure 16:
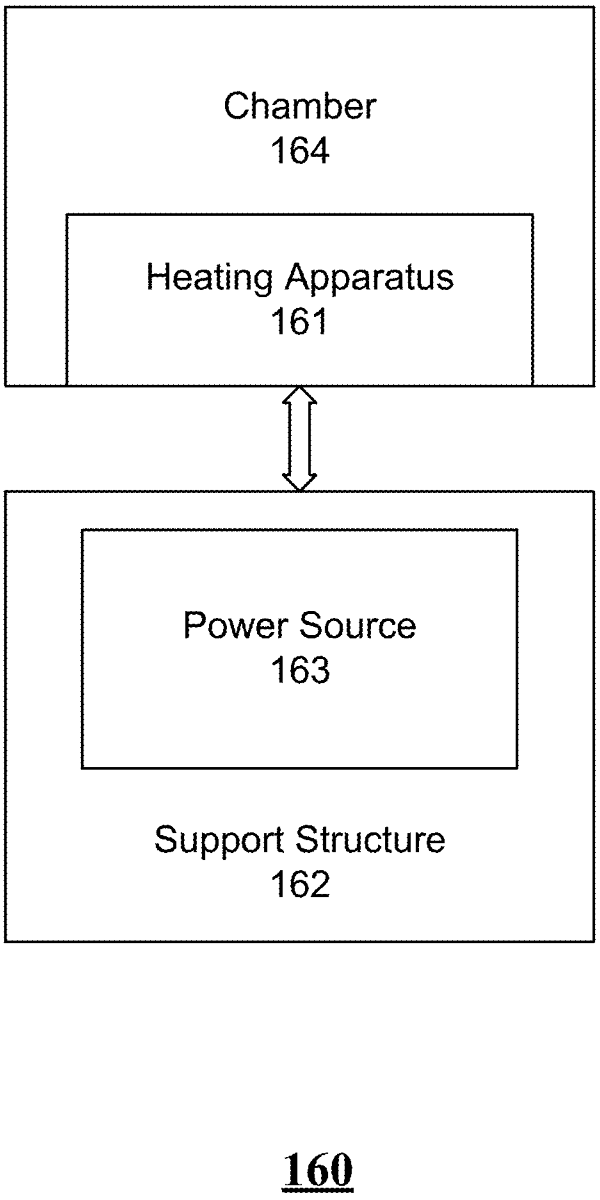
FIG. 16 illustrates a block diagram of an exemplary non-combusted heating device, consistent with some disclosed embodiments.

FIG. 16 illustrates a block diagram of an exemplary non-combusted heating device 160, consistent with some disclosed embodiments. The heating device 160 may incorporate a heating apparatus 161. The heating apparatus 161 may have the same configuration or may be manufactured by the same process as the other heating apparatuses disclosed herein. The heating device 160 may further include a support structure 162 connected to the heating apparatus 161, thus fixating the position of the heating apparatus 161 in the heating device 160. In some embodiments, the support structure 162 may include a base, which may have the same configuration or may be manufactured by the same process as the other bases (e.g., base 20) disclosed herein. The base may include one or more electrodes (e.g., electrode 124, 125) through which the heating apparatus 161 may be electrically coupled to a power source 163. The power source 163 may be provided in the support structure 162. Thus, the heating element (e.g., heating element 120) of the heating apparatus 161 may receive electrical power from the power source 163 and convert the electrical power into thermal power to heat the product received in the heating apparatus. The power source 163 according to the present disclosure may be a DC power source (e.g., primary or secondary batteries) or an AC power source (e.g., mains electricity supply with a voltage of 110V, 220V, etc.). Generally speaking, the DC power source is more suitable to portable devices than the AC power source.

In some embodiments, the heating device 160 may further include a chamber 164 connected to the support structure 162. The chamber 164 may surround the heating apparatus 161 and receive the product to be heated. The chamber 164 may guard the product from being contacted by humans or other unintended objects. This could prevent inadvertent burning. It may also preserve the heat generated by the heating apparatus 161 within the chamber 164, thus enhancing the heating efficiency.

Figure 17:
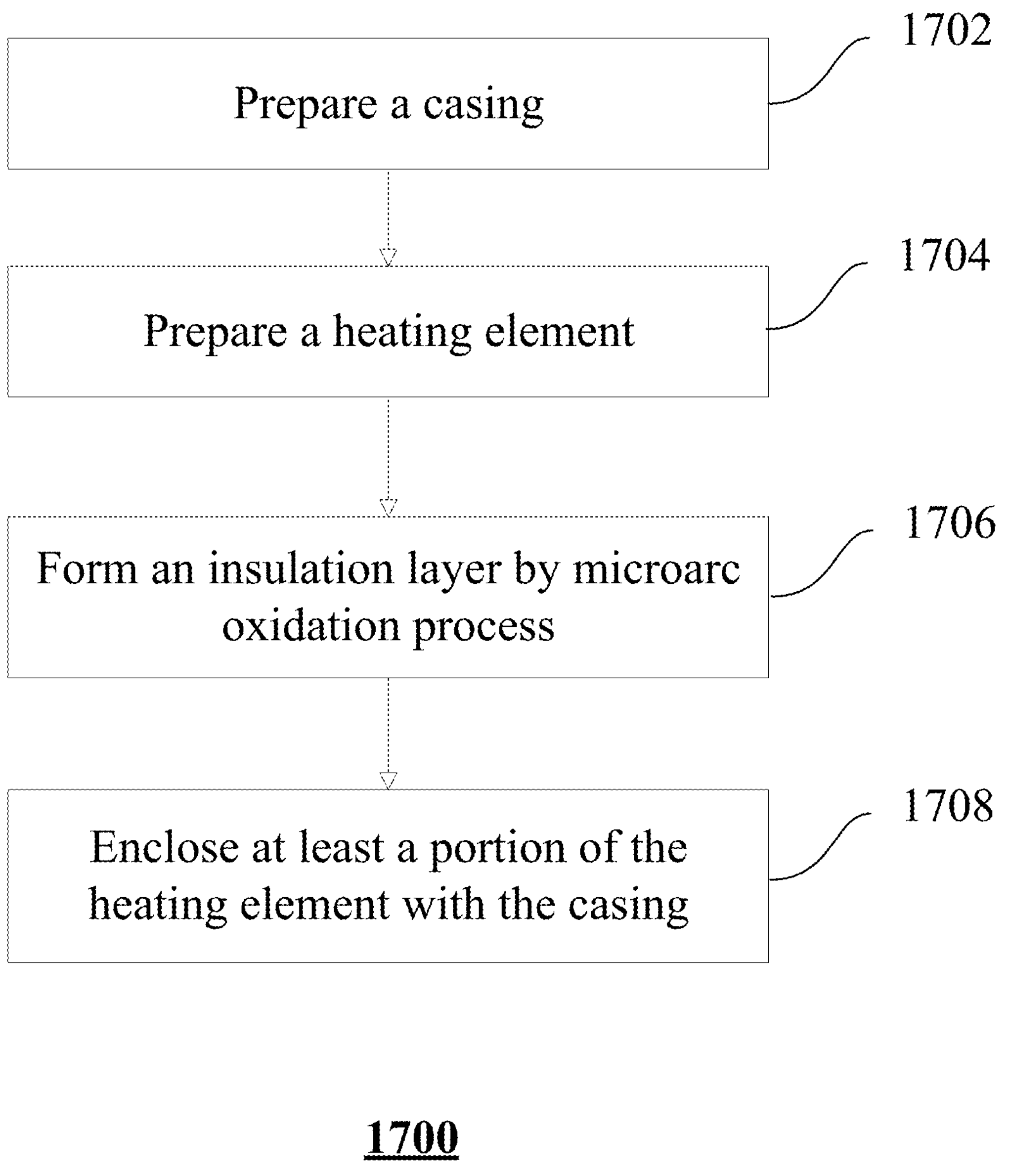
FIG. 17 illustrates a flow chart of an exemplary method for manufacturing a heating apparatus, consistent with some disclosed embodiments.

FIG. 17 illustrates a flow chart of an exemplary method 1700 for manufacturing a heating apparatus, consistent with some disclosed embodiments. It is to be appreciated that some of the steps may be optional to perform the disclosure provided herein. Further, some of the steps may be performed simultaneously, or in a different order than those shown in FIG. 17.

Figure 18:
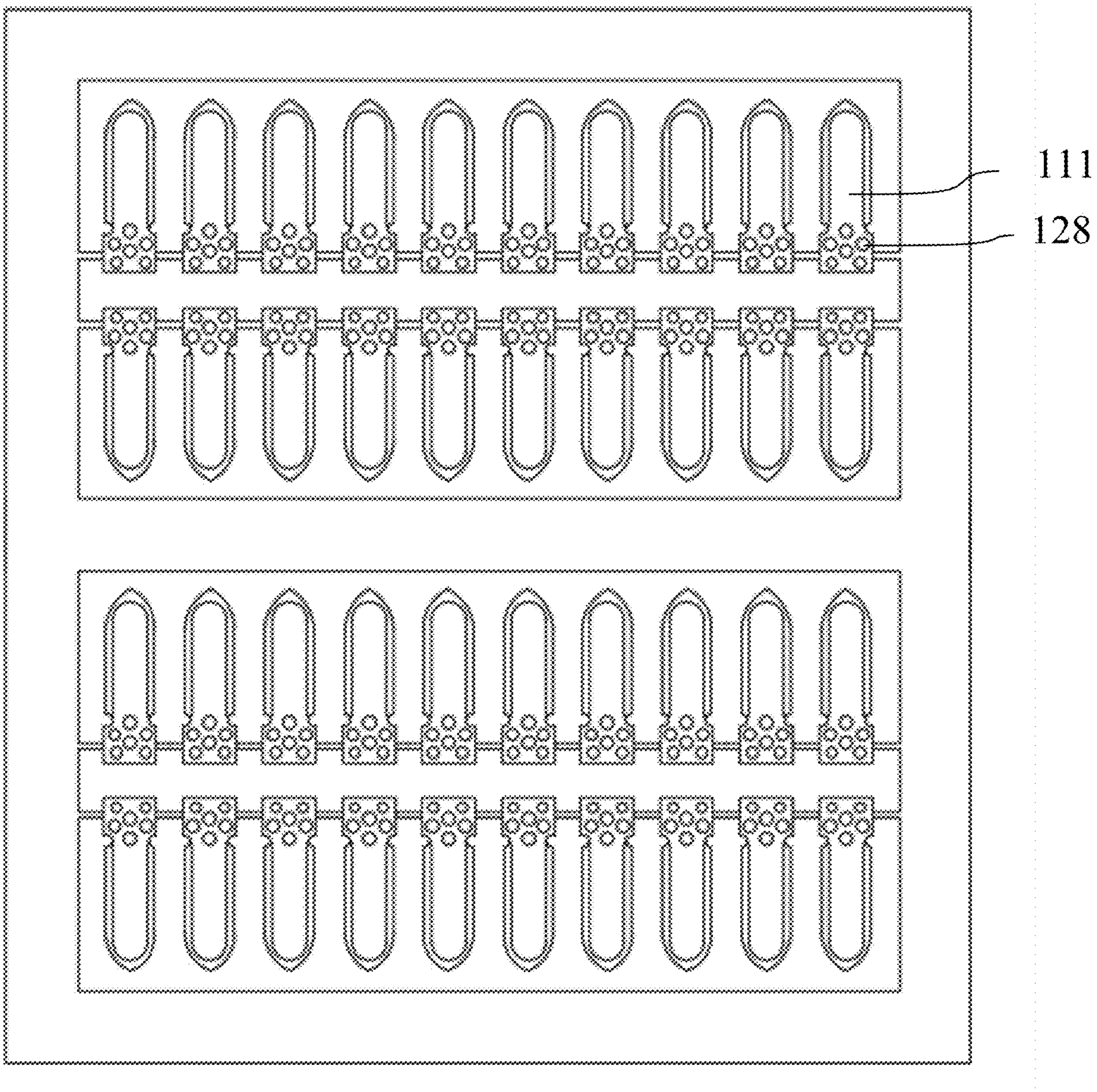
FIG. 18 illustrates an intermediate process of preparing a casing of the heating apparatus, consistent with some disclosed embodiments.

At Step 1702, a casing is prepared. In some embodiments, the casing nay be enclosed by at least one casing plate. FIG. 18 illustrates an intermediate process of preparing a casing of the heating apparatus, consistent with some disclosed embodiments. As illustrated in FIG. 18, a plurality of shapes are created by, e.g., etching or cutting, on a metal plate having a predetermined pattern, each of which corresponds to the shape of a first casing plate 111. At least one hole 128 may be punched through each shape on the metal plate. In the embodiments where the casing consists of two casing plates, the other casing plate may be manufactured by the same process as the first casing plate 111; thus the manufacturing process will not be repeated here.

In some embodiments, the metal plate may include a valve metal, such as Al, Mg, Ti, W, Zr, Nb and Ta. Thus, the resulted casing plates may also include the same valve metal. According to some embodiments, the first casing plate 111 may include a holding cavity on its internal surface, which can be manufactured by etching the casing plate or bending the edges of the casing plate, so that the heating element can be at least partially disposed in the holding cavity. The holding cavity is adapted to hold the heating element closely with or without space between the heating element and the casing. In some embodiments, the first casing plate 111 may further include a positioning groove, which may be manufactured by machining or by etching through a pattern that is the same as the coil pattern of the heating element. The positioning groove may fixate the heating element inside the casing. In the embodiments where multiple casing plates are used to form the casing, the multiple casing plates may be connected by pressure welding, so that the casing may be enclosed tightly. Alternatively, the casing plates may be connected by bolts or other locking mechanisms. According to the present disclosure, the casing may also be formed by a unibody structure (e.g., in a cylindrical shape).

Figure 19A:
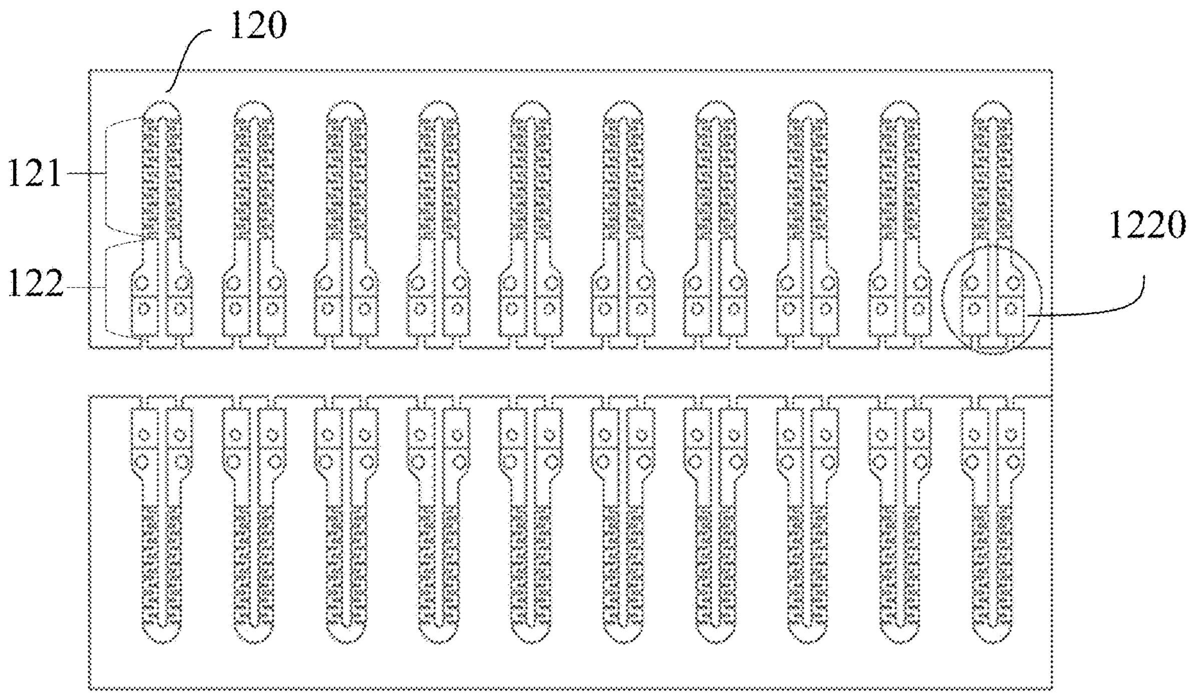
FIG. 19A illustrate an intermediate process of preparing a heating element of the heating apparatus, consistent with some disclosed embodiments.

Referring back to FIG. 17, at Step 1704, a heating element is prepared. FIG. 19A illustrates an intermediate process of preparing a heating element of the heating apparatus, consistent with some disclosed embodiments. As illustrated in FIG. 19A, a plurality of shapes are created by, e.g., etching or cutting, on a metal plate having another predetermined pattern, each of which corresponds to the shape of a heating element 120. Other than the shape shown in FIG. 19A, the heating element 120 can also be a heating coil in a flat shape as illustrated in FIGS. 2-5, a solenoid shape as illustrated in FIGS. 10-12, or a V shape as illustrated in FIGS. 13-14. Bending or shaping the heating element 120 may be required to achieve the desired shape. In some embodiments, the metal plate may include a valve metal, such as Al, Mg, Ti, W, Zr, Nb and Ta. Thus, the resulted heating elements may also include the same valve metal. As illustrated in FIG. 19A, the heating element 120 may include a heating portion 121 and a conductive portion 122.

Figure 19B:
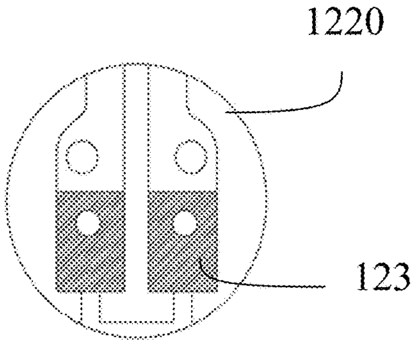
FIG. 19B illustrates an enlarged view of a part of the exemplary heating element shown in FIG. 19A, consistent with some disclosed embodiments.

FIG. 19B illustrates an enlarged view of a part 1220 of the exemplary heating element shown in FIG. 19A, consistent with some disclosed embodiments. According to the present disclosure, at least a portion of the conductive portion 122 may be made into at least one electrode 123. After an insulation layer is formed on the surface of the heating element 120 (which will be discussed in detail below), the insulation layer covering the portion of the underlying metal constituting the electrode 123 may be etched off by laser so that the electrode 123 can connect electrically with other components, such as a power source providing electrical power to the heating element 120 for conversion into thermal power. In some embodiments, a pair of electrodes 123 may be formed as a pair of pins connecting the heating element 120 to the power source of a non-combusted heating device.

Referring back to FIG. 17, at Step 1706, an insulation layer may be formed by an MAO process between an internal surface of the casing and an external surface of the heating element. In some embodiments, the insulation layer may be formed on the external surface of the heating element, on the internal surface of the casing, or on both the external surface of the heating element and the internal surface of the casing. The MAO process may include preparing an electrolyte, immersing the surface to be prepared into the electrolyte, and charging the surface with a power source to form the insulation layer on the surface. When an insulation layer is "formed on" a surface, it means the insulation layer is generated by a reaction between the metal of the surface and the electrolyte that results in a metal oxide, and the metal composition of the metal oxide of the insulation layer is the same as the metal of the surface. Therefore, the insulation layer is tightly attached to the surface with substantial abrasion resistance.

In some embodiments, the electrolyte may be a mixture of multiple types of solution, including at least sodium silicate solution, sodium hydroxide solution, and film-forming additive, where the solution concentration of the sodium silicate solution is 12 g/L-19 g/L, the solution concentration of the sodium hydroxide solution is 2 g/L-8 g/L, and the solution concentration of the film-forming additive is 4 g/L-8 g/L. The sodium silicate is the main salt of the electrolyte, and the sodium hydroxide is used to adjust the pH of the electrolyte. The percentage of each of the solution in the electrolyte is: 1.2%-1.9% of the sodium silicate solution, 0.2%-0.8% of the sodium hydroxide solution, and 0.4%-0.8% of the film-forming additive. The film-forming additive could be potassium fluoride, sodium fluoride, sodium citrate, etc. It is understood that other suitable film-forming additives may also be used as long as the same purpose of the present disclosure can be achieved.

In some embodiments, during the formation of the insulation layer, the power source for the MAO process may have an electric current density of 1.6 $A/dm^3$-2.4 $A/dm^3$, a cut-off discharge voltage of 320V-380V, and a frequency of 800 HZ-1200 HZ. A layer including a metal oxide is formed on the surface, and the type of the metal oxide is determined by the metal composition at the surface of the metal plate. The metal oxide can be an oxide with nanometer-level fineness. After the MAO process, the surface subject to the MAO process may be cleaned by a neutral ultrasound cleaning fluid, and then immersed in hot water with a temperature of not less than 80° C. Subsequently, a polycrystalline ceramic insulation layer may be formed on the surface. The insulation layer may have subtle holes on it at this intermediate stage. But such holes will be sealed off and thus disappear when the insulation layer is dried at a high temperature. As a result, the insulation layer according to the present disclosure may be continuously formed. The thickness of the insulation layer may be on the order of micrometers. In some embodiments, the thickness of the insulation layer may be between 5 μm and 20 μm.

Figure 20:
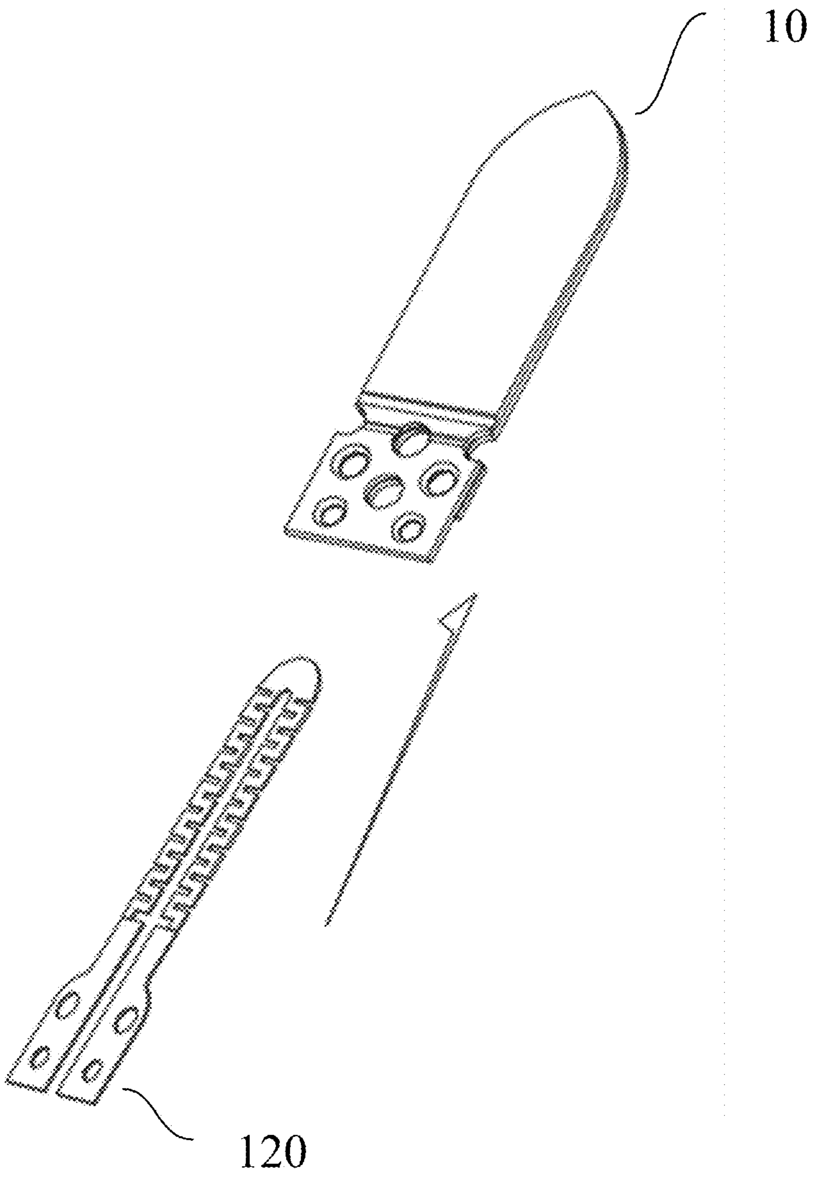
FIG. 20 illustrates an exemplary process of assembling the heating apparatus, consistent with some disclosed embodiments.

At Step 1708, at least a portion of the heating element may be enclosed in the casing. FIG. 20 illustrates an exemplary process of assembling the heating apparatus, consistent with some disclosed embodiments. As shown in FIG. 20, a casing 10 is completely formed, with one side using the casing plate prepared in accordance with Step 1702, as described in conjunction with FIG. 18. A heating element 120 is also completely formed, using the heating element prepared in accordance with Step 1704, as described in conjunction with FIGS. 19A and 19B. Thus, the heating element 120 may be inserted into the space enclosed by the casing plates of the casing 10. Thus, a portion of the heating element 120 may be enclosed by the casing 10, while the remaining portion may be exposed as a conductive portion electrically coupled to a power source. In such embodiments, an immediate contact between the heating element 120 and the casing 10 may be realized by a tightening method applied to the casing plates, such as tightening up the casing plates by bolts. In other embodiments, the heating element 120 may be enclosed in the casing 10 before the casing plates are connected by pressure welding, in which way the heating element 120 may be in immediate contact with an internal surface of the casing 10 after assembly because of the pressure applied when the two casing plates are welded together.

In some embodiments, the heating apparatus manufactured by the process disclosed herein may operate with a temperature of 200-380° C., while it can properly function under 600° C. for a relatively long working time and up to 800° C. for a relatively short working time.

Figure 21:
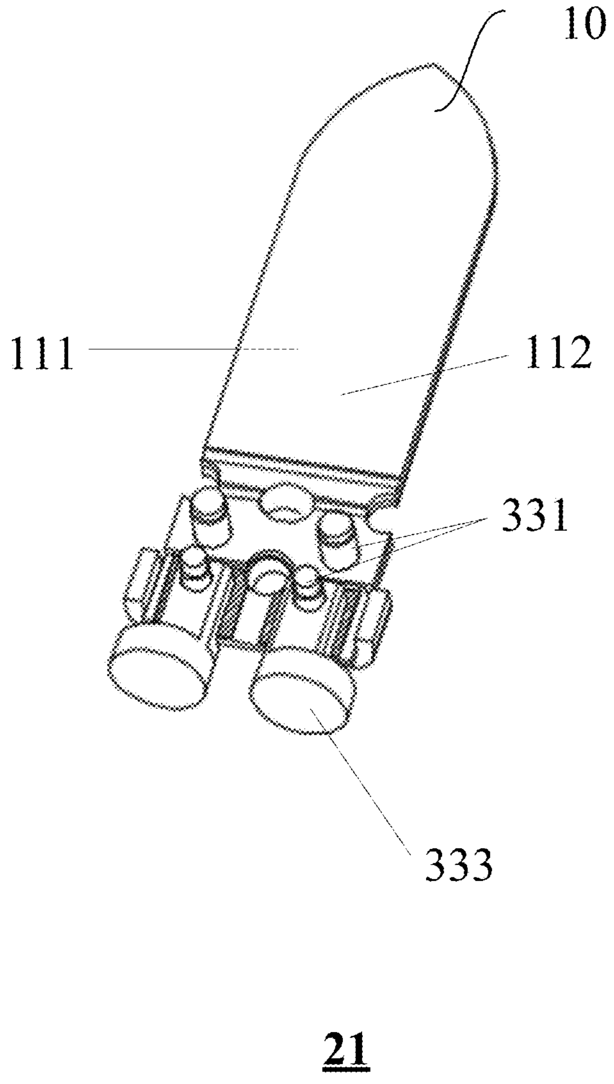
FIG. 21 illustrates an exemplary process of fixating a casing, a heating element and contacts with a limiter bracket of a heating apparatus, consistent with some disclosed embodiments.

FIG. 21 illustrates an exemplary process of fixating a casing 10, a heating element 120 and contacts 333 with a limiter bracket of a heating apparatus 21, consistent with some disclosed embodiments. For an exploded view of the same heating apparatus (except for an additional base 20), one may refer to FIG. 7 for the heating apparatus 7. In some embodiments, the second casing plate 112 (facing the viewer of FIG. 21) is shorter than the first casing plate 111 (on the back of the casing plate 112), and therefore the electrode 123 is exposed from the casing 10 on the side of the second casing plate 112. The contacts 333 may electrically connect with the electrode 123 on the side of the second casing plate 112, and the limiter rods 331 of the limiter bracket may pass through one or more holes on the first casing plate 111, the heating element 120, and the contacts 333 to fixate their relative positions.

Figure 22:
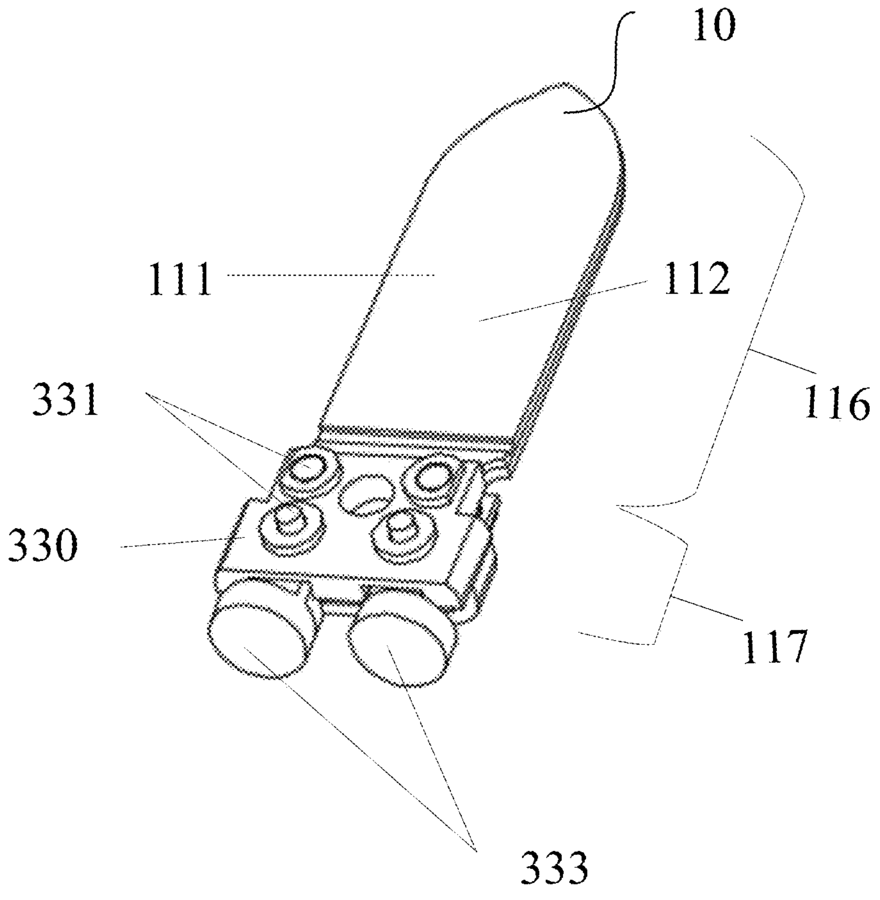
FIG. 22 illustrates an exemplary process of fixating a casing, a heating element and contacts with a limiter bracket of another heating apparatus, consistent with some disclosed embodiments.

FIG. 22 illustrates an exemplary process of fixating a casing 10, a heating element 120 and contacts 333 with a limiter bracket of another heating apparatus 22, consistent with some disclosed embodiments. For an exploded view of the same heating apparatus (except for an additional base 20), one may refer to FIG. 7 for the heating apparatus 7. A pair of covers 330 may cover a fixation portion 117 of the casing 10, as well as the correspondingly positioned heating element 120 and a portion of the contacts 333. In some embodiments, a plurality of limiter rods 331 and matching nuts may be used to tighten the first casing plate 111 and the second casing plate 112. This may press the heating element 120 to be in immediate contact with the casing 10. As a result, heat may be passed from the heating element 120 to the casing 10 more efficiently, and the relative positions among the casing 10, the heating element 120, the contacts 333 and the covers 330 may be fixated to prevent displacement during usage.

Figure 23:
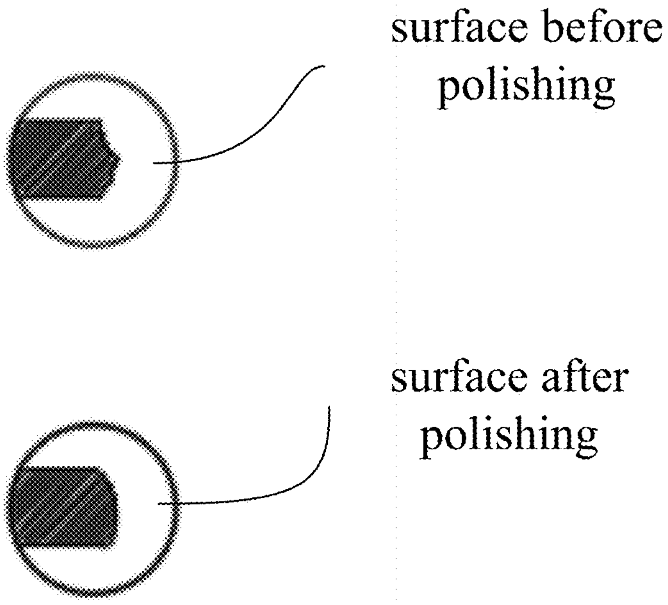
FIG. 23 illustrates a schematic diagram of a surface of an exemplary heating apparatus, consistent with some disclosed embodiments.

FIG. 23 illustrates a schematic diagram of a surface of an exemplary heating apparatus, consistent with some disclosed embodiments. As shown in FIG. 23, a surface of the heating apparatus can be polished, which may be done with sand paper or a polishing machine. This may make the surface of the heating apparatus smoother so that the insulation layer thereon is more durable and has higher thermal efficiency. The surface of the heating apparatus can also be blued under a temperature of 400-500° C., which improves the anti-corrosion property of the heating apparatus.

It is noted that a casing is not necessary for the manufacturing method described above. According to the present disclosure, a heating apparatus may include a heating element without a casing, and the heating element may be manufactured in a method similar to those discussed above in conjunction with FIGS. 17-23. Alternatively, reasonable adjustment can be made to make the heating element more suitable to achieve the same purpose of the present disclosure without the casing.

According to one aspect of the present disclosure, a heating apparatus for use with a non-combusted heating device is disclosed. The heating apparatus includes a casing with an end for receiving a product to be heated, a heating element at least partially disposed within the casing, and an insulation layer formed between an internal surface of the casing and an external surface of the heating element. The insulation layer includes a polycrystalline material having a valve metal oxide.

In some embodiments, the insulation layer is formed on the external surface of the heating element.

In some embodiments, the heating element includes a first valve metal, and the valve metal oxide includes the same metal as the first valve metal.

In some embodiments, the heating element includes titanium or aluminum.

In some embodiments, the casing includes a second valve metal, and the valve metal oxide includes the same metal as the second valve metal.

In some embodiments, the casing includes titanium or aluminum.

In some embodiments, the casing includes a unibody, and the insulation layer is formed on at least a portion of the internal surface of the casing.

In some embodiments, the insulation layer is formed by microarc oxidation on one or more of the external surfaces of the heating element, or at least a portion of the internal surface of the unibody casing.

In some embodiments, the heating element is at least partially disposed in a space of the casing enclosed by two or more casing plates, and the insulation layer is formed on at least one internal surface of the casing plates.

In some embodiments, the insulation layer is formed by microarc oxidation on one or more of the external surfaces of the heating element, or at least one internal surface of the casing plates.

In some embodiments, the insulation layer is formed continuously.

In some embodiments, the thickness of the insulation layer is between 5 μm and 20 μm.

In some embodiments, a holding cavity is formed on at least one internal surface of the casing.

In some embodiments, a positioning groove is formed on at least one internal surface of the casing. The shape of the positioning groove matches the shape of the heating element. The heating element is fixed in the positioning groove.

In some embodiments, a length of one casing plate is shorter than a length of at least one of the other casing plates.

In some embodiments, the casing includes a blade shape.

In some embodiments, the heating element is a heating coil having a flat shape.

In some embodiments, the casing includes a cylindrical shape.

In some embodiments, the heating element is a solenoid heating coil, and the heating element spirals around a rod.

In some embodiments, a cross section of the space of the casing includes two V shapes symmetrical along a longitudinal axis of the casing.

In some embodiments, the heating element includes two heating coils. A cross section of each of the heating coils includes a V shape, and the V shape of the heating coils matches the V shape of the space of the casing.

In some embodiments, the heating element is enclosed in the casing and in immediate contact with the internal surface of the casing.

In some embodiments, the heating element includes a heating portion and a conductive portion.

In some embodiments, the heating element includes at least one hole. The at least one hole is on the conductive portion or on the heating portion at a location closer to the conductive portion than to an end of the heating element for receiving the product to be heated.

In some embodiments, the non-combusted heating device includes a power source, and the heating element is heated by electrical power provided from the power source.

In some embodiments, the conductive portion of the heating element includes a pair of pins electrically coupled to the power source.

In some embodiments, the heating apparatus further includes a limiter bracket and a base. The limiter bracket is configured to fixate the pair of pins to the limiter bracket and the base is configured to position the pair of pins to be removably connected to the power source via a contact.

In some embodiments, the casing includes at least one hole at a position corresponding to the position of the at least one hole of the heating element when the pair of pins are fixated to the limiter bracket.

In some embodiments, the limiter bracket includes two covers. The two covers enclose the pair of pins when the limiter bracket fixates the pair of pins. At least one of the two covers includes a limiter rod configured to pass through the at least one hole of the heating element and the at least one hole of the casing.

In some embodiments, the casing includes a heating portion, a fixation portion, and at least one heat insulation structure between the heating portion and the fixation portion. The heating portion of the casing is at a position corresponding to the heating portion of the heating element. The fixation portion of the casing is at a position corresponding to the conductive portion of the heating element.

In some embodiments, the at least one heat insulation structure includes a heat insulation groove.

In some embodiments, the at least one heat insulation structure is positioned at at least one side of the casing.

In some embodiments, the heat insulation groove is perpendicular to the line extending from the heating portion of the casing to the fixation portion of the casing.

In some embodiments, the heat insulation groove has a semicircular carve-out on the side edge of the casing.

In some embodiments, the at least one heat insulation structure includes a heat insulation hole.

In some embodiments, the highest operation temperature of the heating element is 800° C.

In some embodiments, a normal operation temperature of the heating element is between 200° C. and 380° C.

In some embodiments, the product includes at least one of nicotine, spice, or medicine.

In some embodiments, the product includes vaping fluid.

According to another aspect of the present disclosure, a heating apparatus for use with a non-combusted heating device is disclosed. The heating apparatus includes a heating element with an end for receiving a product to be heated and an insulation layer formed on an external surface of the heating element. The insulation layer includes a polycrystalline material having a valve metal oxide.

In some embodiments, the heating element includes a valve metal, and the valve metal oxide includes the same metal as the valve metal.

In some embodiments, the heating element includes titanium or aluminum.

In some embodiments, the insulation layer is formed continuously.

In some embodiments, the thickness of the insulation layer is between 5 μm and 20 μm.

In some embodiments, the heating element is a heating coil having a flat shape.

In some embodiments, the heating element is a solenoid heating coil, and the heating element spirals around a rod.

In some embodiments, the heating element includes two heating coils. A cross section of each of the heating coils includes a V shape.

According to another aspect of the present disclosure, a non-combusted heating device is disclosed. The non-combusted heating device includes the heating apparatus disclosed above, and further includes a support structure and a power source. The support structure is connected to the heating apparatus for fixating the position of the heating apparatus in the non-combusted heating device. The power source is provided in the support structure and electrically coupled to the heating apparatus for providing electrical power to the heating element.

In some embodiments, the non-combusted heating device further includes a chamber connected to the support structure. The chamber surrounds the heating apparatus and receives the product to be heated.

According to another aspect of the present disclosure, a method for manufacturing a heating apparatus is disclosed. The method includes preparing a heating element including a metal, preparing a casing including a metal, and enclosing at least a portion of the heating element with the casing. An insulation layer is formed by microarc oxidation process on at least one of an internal surface of the casing and an external surface of the heating element. The at least one surface on which the insulation layer is formed includes a valve metal.

In some embodiments, the valve metal includes titanium or aluminum.

In some embodiments, preparing a heating element includes etching a first metal plate according to a first predetermined pattern. The first predetermined pattern corresponds to the shape of the heating element.

In some embodiments, the microarc oxidation process includes preparing an electrolyte, immersing in the electrolyte the at least one surface on which the insulation layer is formed, and charging the surface with an MAO power provided by an MAO power source until the insulation layer is formed on the surface. The electrolyte includes at least sodium silicate, sodium hydroxide, and film-forming additive.

In some embodiments, the solution concentration of the sodium silicate is 12 g/L-19 g/L, the solution concentration of the sodium hydroxide is 2 g/L-8 g/L, and the solution concentration of the film-forming additive is 4 g/L-8 g/L.

In some embodiments, the MAO power has an electric current density of 1.6 $A/dm^3$-2.4 $A/dm^3$, a cut-off discharge voltage of 320V-380V, and a frequency of 800 HZ-1200 HZ.

In some embodiments, the method further includes providing two or more casing plates by etching a second metal plate having at least a second predetermined pattern and joining the two or more casing plates to form the casing. The second predetermined pattern corresponds to a shape of at least one of the two or more casing plates. The heating element is at least partially enclosed in the casing.

In some embodiments, the method further includes forming a holding cavity on at least one internal surface of the casing plates.

In some embodiments, the method further includes forming a positioning groove on at least one internal surface of the casing plates. The shape of the positioning groove matches the shape of the heating element. The heating element is fixed in the positioning groove.

In some embodiments, joining the two or more casing plates further includes using a pressure welding process to weld the two or more casing plates together to form the casing.

In some embodiments, the insulation layer is formed continuously.

In some embodiments, the thickness of the insulation layer is between 5 μm and 20 μm.

In some embodiments, the method further includes forming the casing to include a blade shape according to the second predetermined pattern.

In some embodiments, the method further includes forming the heating element to include a heating coil having a flat shape according to the first predetermined pattern.

In some embodiments, the method further includes forming the casing to include a cylindrical shape according to the second predetermined pattern.

In some embodiments, the method further includes forming the heating element to include a solenoid heating coil according to the first predetermined pattern and providing a rod to be positioned along a central longitudinal axis of the solenoid heating coil.

In some embodiments, a cross section of the space of the casing includes two V shapes symmetrical along a longitudinal axis of the casing.

In some embodiments, the heating element includes two heating coil. A cross section of each of the heating coil includes a V shape. The V shape of the heating coils matches the V shape of the space of the casing.

In some embodiments, the heating element is enclosed in the casing and in immediate contact with the internal surface of the casing.

In some embodiments, the heating element includes a heating portion and a conductive portion.

In some embodiments, the method further includes forming at least one hole on the heating element. The at least one hole is on the conductive portion or on the heating portion at a location closer to the conductive portion than to an end of the heating element for receiving a product to be heated.

In some embodiments, the non-combusted heating device includes a power source. The heating element is heated by electrical power provided from the power source.

In some embodiments, the method further includes forming a pair of pins in the conductive portion of the heating element. The pair of pins are electrically coupled to the power source.

In some embodiments, the method further includes providing a limiter bracket and providing a base. The limiter bracket is configured to fixate the pair of pins to the limiter bracket. The base is configured to position the pair of pins to be removably connected to the power source via a contact.

In some embodiments, the method further includes providing at least one hole in the at least one of the casing plates. The position of the at least one hole corresponds to the position of the at least one hole of the heating element when the pair of pins are fixated to the limiter bracket.

In some embodiments, the limiter bracket includes two covers. The two covers enclose the pair of pins when the limiter bracket fixates the pair of pins. At least one of the two covers includes a limiter rod configured to pass through the at least one hole of the heating element and the at least one hole of the casing plate.

In some embodiments, the casing includes a heating portion, a fixation portion, and at least one heat insulation structure between the heating portion and the fixation portion. The heating portion of the casing is at a position corresponding to the heating portion of the heating element. The fixation portion of the casing is at a position corresponding to the conductive portion of the heating element.

In some embodiments, the at least one heat insulation structure includes a heat insulation groove.

In some embodiments, the at least one heat insulation structure is positioned at at least one side of the casing.

In some embodiments, the heat insulation groove is perpendicular to the line extending from the heating portion of the casing to the fixation portion of the casing.

In some embodiments, the heat insulation groove has a semicircular carve-out on the side edge of the casing.

In some embodiments, the at least one heat insulation structure includes a heat insulation hole.

In some embodiments, the highest operation temperature of the heating element is 800° C.

In some embodiments, the normal operation temperature of the heating element is between 200° C. and 380° C.

In some embodiments, the method further includes polishing the casing.

In some embodiments, the method further includes bluing the casing at a temperature between 400° C. and 500° C.

According to another aspect of the present disclosure, a method for manufacturing a non-combustible heating device is disclosed. The method includes providing a heating apparatus using the method disclosed above, connecting a support structure to the heating apparatus for fixating the position of the heating apparatus in the non-combusted heating device, and providing a power source in the support structure. The power source is electrically coupled to the heating apparatus for providing electrical power to the heating element.

In some embodiments, the method includes providing a switch electrically coupled to the power source for controlling on and off of the electrical power or holding the electrical power on for a certain period of time.

In some embodiments, the method includes providing a chamber connected to the support structure. The chamber surrounds the heating apparatus and receives the product to be heated.

It will be apparent to those skilled in the art that various modifications and variations can be made to the disclosed devices and related apparatuses. Other embodiments will be apparent to those skilled in the art from consideration of the specification and practice of the disclosed devices and related apparatuses.

It is intended that the specification and examples be considered as exemplary only, with a true scope being indicated by the following claims and their equivalents.

What is claimed is:

1. A heating apparatus for use with a non-combusted heating device, comprising:

a casing with an end for receiving a product to be heated;

a heating element at least partially disposed within the casing; and an insulation layer formed between an internal surface of the casing and an external surface of the heating element, wherein the insulation layer is configured to electrically insulate the heating element from the casing and permit heat transfer from the heating element to the casing, and the insulation layer comprises a continuous oxide layer disposed on and in contact with at least one of the internal surface of the casing or the external surface of the heating element, wherein the at least one of the internal surface of the casing or the external surface of the heating element comprises a valve metal, and wherein the continuous oxide layer of the insulation layer comprises a polycrystalline material having a valve metal oxide, a metal of the valve metal oxide being the same as the valve metal of the at least one of the internal surface of the casing or the external surface of the heating element.

2. The heating apparatus of claim 1, wherein the insulation layer is formed on the external surface of the heating element.

3. The heating apparatus of claim 1, wherein the heating element comprises a first valve metal.

4. The heating apparatus of claim 3, wherein the first valve metal comprises at least one of titanium, aluminum, or magnesium.

5. The heating apparatus of claim 1, wherein the casing comprises a second valve metal.

6. The heating apparatus of claim 5, wherein the second valve metal comprises at least one of titanium, aluminum, or magnesium.

7. The heating apparatus of claim 1, wherein the casing comprises a unibody, wherein the insulation layer is formed by microarc oxidation on the external surface of the heating element, or at least a portion of the internal surface of the unibody casing, wherein the heating element is at least partially disposed in a space of the casing enclosed by two or more casing plates, wherein the insulation layer is formed on at least one internal surface of the casing plates.

8. The heating apparatus of claim 7, wherein a holding cavity is formed on at least one internal surface of the casing.

9. The heating apparatus of claim 7, wherein a positioning groove is formed on at least one internal surface of the casing, wherein a shape of the positioning groove matches a shape of the heating element, and wherein the heating element is fixed in the positioning groove.

10. The heating apparatus of claim 9, wherein the casing comprises a blade shape or a cylindrical shape, and wherein the heating element is a heating coil having a flat shape or a solenoid heating coil spiraling around a rod.

11. The heating apparatus of claim 10, wherein the heating element is enclosed in the casing and in immediate contact with the internal surface of the casing, wherein the heating element comprises a heating portion, a conductive portion, and at least one hole, and wherein the at least one hole is on the conductive portion or on the heating portion at a location closer to the conductive portion than to an end of the heating element for receiving the product to be heated.

12. The heating apparatus of claim 11, further comprising:

a limiter bracket configured to fixate a pair of pins to the limiter bracket; and a base configured to position the pair of pins to be removably connected to a power source via a contact, wherein the limiter bracket comprises two covers, the two covers enclosing the pair of pins when the limiter bracket fixates the pair of pins, and wherein at least one of the two covers comprises a limiter rod configured to pass through the at least one hole of the heating element and the at least one hole of the casing.

13. The heating apparatus of claim 12, wherein the casing comprises:

at least one hole at a position corresponding to the position of the at least one hole of the heating element when the pair of pins are fixated to the limiter bracket, a heating portion at a position corresponding to the heating portion of the heating element, a fixation portion at a position corresponding to the conductive portion of the heating element, and at least one heat insulation structure between the heating portion and the fixation portion.

14. The heating apparatus of claim 13, wherein the at least one heat insulation structure is positioned at at least one side of the casing and comprises a heat insulation groove or a heat insulation hole, and wherein, when the at least one heat insulation structure comprises the heat insulation groove, the heat insulation groove is perpendicular to a line extending from the heating portion of the casing to the fixation portion of the casing.

15. A non-combusted heating device, comprising:

a heating apparatus;

a support structure connected to the heating apparatus for fixating a position of the heating apparatus in the non-combusted heating device; and a power source provided in the support structure and electrically coupled to the heating apparatus for providing electrical power to the heating apparatus, wherein the heating apparatus further comprises:

a casing with an end for receiving a product to be heated;

a heating element at least partially disposed within the casing; and an insulation layer formed between an internal surface of the casing and an external surface of the heating element, wherein the insulation layer is configured to electrically insulate the heating element from the casing and permit heat transfer from the heating element to the casing, and the insulation layer comprises a continuous oxide layer disposed on and in contact with at least one of the internal surface of the casing or the external surface of the heating element, wherein the at least one of the internal surface of the casing or the external surface of the heating element comprises a valve metal, and wherein the continuous oxide layer of the insulation layer comprises a polycrystalline material having a valve metal oxide, a metal of the valve metal oxide being the same as the valve metal of the at least one of the internal surface of the casing or the external surface of the heating element.

16. A method for manufacturing a heating apparatus, comprising:

preparing a heating element comprising a metal;

preparing a casing comprising a metal, the casing having an end for receiving a product to be heated; and enclosing at least a portion of the heating element with the casing, wherein an insulation layer is formed by a microarc oxidation process on at least one of an internal surface of the casing or an external surface of the heating element, and wherein the insulation layer is configured to electrically insulate the heating element from the casing and permit heat transfer from the heating element to the casing, and the insulation layer comprises a continuous oxide layer disposed on and in contact with the at least one of the internal surface of the casing or the external surface of the heating element, and wherein the at least one of the heating element or the casing comprises a valve metal, and the continuous oxide layer comprises a polycrystalline material having a valve metal oxide, a metal of the valve metal oxide being the same as the valve metal.

17. The method of claim 16, wherein preparing a heating element comprises etching a first metal plate according to a first predetermined pattern, and wherein the first predetermined pattern corresponds to a shape of the heating element.

18. The method of claim 17, further comprising:

forming a positioning groove on at least one internal surface of two or more casing plates, wherein a shape of the positioning groove matches the shape of the heating element, and wherein the heating element is fixed in the positioning groove.

19. The method of claim 17, further comprising:

forming the heating element to comprise a heating coil having a flat shape according to the first predetermined pattern.

20. The method of claim 17, further comprising:

forming the heating element to comprise a solenoid heating coil according to the first predetermined pattern; and providing a rod to be positioned along a central longitudinal axis of the solenoid heating coil.

21. The method of claim 16, further comprising:

providing a limiter bracket configured to fixate a pair of pins to the limiter bracket; and providing a base configured to position the pair of pins to be removably connected to a power source via a contact, wherein the limiter bracket comprises two covers, the two covers enclosing the pair of pins when the limiter bracket fixates the pair of pins, and wherein at least one of the two covers comprises a limiter rod configured to pass through at least one hole of the heating element and at least one hole of the casing.

22. The method of claim 21, further comprising:

providing at least one hole in of casing plates in the casing;

wherein the position of the at least one hole corresponds to the position of the at least one hole of the heating element when the pair of pins are fixated to the limiter bracket, wherein the casing comprises a heating portion, a fixation portion, and at least one heat insulation structure between the heating portion and the fixation portion, wherein the heating portion of the casing is at a position corresponding to the heating portion of the heating element, and wherein the fixation portion of the casing is at a position corresponding to a conductive portion of the heating element.

23. The method of claim 22, wherein the at least one heat insulation structure is positioned at at least one side of the casing and comprises a heat insulation groove or a heat insulation hole, and wherein, when the at least one heat insulation structure comprises the heat insulation groove, the heat insulation groove is perpendicular to a line extending from the heating portion of the casing to the fixation portion of the casing.

24. The method of claim 16, further comprising:

polishing the casing, and bluing the casing at a temperature between 400° C. and 500° C.

* * * * *